(12) United States Patent
Cooley et al.

(10) Patent No.: US 6,926,364 B2
(45) Date of Patent: Aug. 9, 2005

(54) FOLD FLAT VEHICLE SEAT IN REARWARD POSITION

(75) Inventors: Thomas J. Cooley, Lapeer, MI (US); David M. Blair, Troy, MI (US)

(73) Assignee: Faurecia Automotive Seating Canada Limited, Mississauga (CA)

( * ) Notice: Subject to any disclaimer, the term of this patent is extended or adjusted under 35 U.S.C. 154(b) by 132 days.

(21) Appl. No.: 10/643,914

(22) Filed: Aug. 20, 2003

(65) Prior Publication Data

US 2004/0070250 A1 Apr. 15, 2004

Related U.S. Application Data

(60) Provisional application No. 60/405,386, filed on Aug. 23, 2002.

(51) Int. Cl.$^7$ .............................. B60N 2/06; B60N 2/07
(52) U.S. Cl. ................ 297/378.12; 297/341; 297/344.1
(58) Field of Search .............................. 297/344.1, 341, 297/378.12; 296/65.09, 65.13

(56) References Cited

U.S. PATENT DOCUMENTS 4,973,104 A * 11/1990 Nakayama et al. ......... 297/341
5,597,206 A * 1/1997 Ainsworth et al. ..... 297/378.12
6,336,679 B1    1/2002 Smuk

FOREIGN PATENT DOCUMENTS

EP              232685 A1 *  8/1987 ............ B60N/1/02

* cited by examiner

Primary Examiner—Anthony D. Barfield
(74) Attorney, Agent, or Firm—Patrick J. Hofbauer

(57) ABSTRACT

A fold flat vehicle seat comprises a seat assembly mounted on a movable track member slidably engaging a fixed track member, and lockable by a track lock. The seat assembly includes a seatback member mounted on a seat cushion member for forward folding between an upright occupiable design position and a horizontal load supporting position. A link arm member is mounted on the seatback member for movement therewith between a lowered track engagement position and a raised track clearing position. When the link arm member is in the lowered track engagement position, it interacts with a link engaging portion of the fixed track member to permit the forward folding of the seatback member to the substantially horizontal load supporting position and to thereat preclude longitudinal motion of the seat assembly relative to the fixed track member, so as to retain the seat assembly in its predetermined rear longitudinal position.

21 Claims, 19 Drawing Sheets

FOLD FLAT VEHICLE SEAT IN REARWARD POSITION

FIELD OF THE INVENTION

The present invention relates to vehicle seats that fold flat to a substantially horizontal load supporting position and more particularly to such vehicle seats that move to such a substantially horizontal load supporting position as the seatback member is being forwardly folded over the seat cushion member.

BACKGROUND OF THE INVENTION

Multi-seat vehicles, such as vans, minivans, sport utility vehicles, and the like, typically have middle (second row) and rear (third row) vehicles seats that are placed rearwardly of the driver's and front passenger's (first row) vehicle seats. The second and third row seats are typically selectively removable and replaceable through a large rear or side door in order to ready the vehicle for carrying cargo. Removal and replacement of these vehicle seats tends to be somewhat difficult and requires a considerable amount of effort on the part of the user, especially with respect to the middle vehicle seat.

To overcome this problem and so as to maximize cargo carrying capabilities, many second and third row seats, and even some first row passenger seats, are configurable from an upright occupiable position to a substantially horizontal load supporting position, whereat the back surface of the seatback acts as a load supporting surface, by means of forwardly folding the seatback member over the seat cushion member.

A vehicle seat having such a forwardly folding capability is disclosed in U.S. Pat. No. 6,336,679 issued Jan. 8$^{th}$, 2002 to Smuk, and entitled Rotary Recliner Control Mechanism for Multi-function Vehicle Seat Applications. In this vehicle seat, the seatback member is forwardly foldable from its upright occupiable position over the seat cushion member to a so-called "easy entry", (hereinafter, "E-Z entry") position following manual manipulation of a first handle, and is forwardly foldable from either its upright occupiable position or its "E-Z entry" position to its fully forwardly folded load supporting position following manual manipulation of a second handle.

However, folding the Smuk seat forwardly to its fully forwardly folded load supporting position does not cause the track lock means to release. Accordingly, said fully forwardly folded load supporting position is realized through manual manipulation of the second handle in whichever longitudinal position the seat assembly is in when the seatback member is fully forwardly folded over the seat cushion member. This can be undesirable for at least two reasons.

Firstly, during the forward folding of a seatback member over the seat cushion member, there may be interference between the headrest of the seatback member being forwardly folded with a part of the vehicle's interior disposed immediately in front of it. For instance, a front passenger seat headrest might hit the dashboard upon forward folding of its seatback member. A second row seat, or a third row seat, might hit the rear of the seatback member disposed immediately in front of it. Such interference precludes the seatback member from forthwith reaching its fully forwardly folded position, which is unacceptable and inconvenient for a user.

Secondly, depending on the longitudinal position of the seat assembly, there may tend to be a gap between longitudinally adjacent seats that are in the fully forwardly folded position. Such gaps tends to permit objects to fall between longitudinally adjacent seats, or to become caught between them during loading. Such gaps are undesirable, and accordingly should be minimized, or even be made nonexistent.

Another significant problem involves users try to fold the seatback member from the "E-Z entry" position to the fully forwardly folded position by releasing the first handle (that invokes the "E-Z entry" function), but not the second handle that invokes the fold flat function. Upon believing that the proper handles have been activated, such that the seatback can then be forwardly folded even further to the fully forwardly folded position, users tend to push forwardly and downwardly on the seatback, even though it is still latched in the "E-Z entry" position. Accordingly, various parts and assemblies of the seat hardware can become bent or otherwise damaged, such as stop pins, handles, levers, sheathed connecting cables and so on.

It is an object of the present invention to provide a fold flat vehicle seat wherein a substantially horizontal load supporting position is attainable only in a predetermined rear longitudinal position of said seat assembly.

It is a further object of the present invention to provide a fold flat vehicle seat wherein the seatback member folds over the seat cushion member to a substantially horizontal load supporting position, irrespective of the longitudinal starting position of the seat assembly.

It is another object of the present invention to provide a fold flat vehicle seat, wherein the headrest of the seatback member being forwardly folded does not interfere with a part of the vehicle's interior disposed immediately in front of it.

It is a further object of the present invention to provide a fold flat vehicle seat, wherein the gap between longitudinally adjacent seats is minimized, or made nonexistent.

It is a further object of the present invention to provide a fold flat vehicle seat, wherein the chance of damaging various parts or components of the mechanism is minimized, or made nonexistent, when the seatback member is folded from the "E-Z entry" position to the fully forwardly folded position.

SUMMARY OF THE INVENTION

In accordance with one aspect of the present invention there is disclosed a fold flat vehicle seat comprising a movable track member slidably engaging a fixed track member having a seat assembly mounted thereon for longitudinal sliding movement of the movable track member and the seat assembly relative to the fixed track member along a longitudinal axis. A track lock means is operatively interconnected between the movable and fixed track members and movable between a locked configuration whereat the movable track member is precluded from moving longitudinally relative to the fixed track member and a released configuration whereat the movable track member is permitted to move longitudinally relative to the fixed track member. The seat assembly includes a seat cushion member mounted on the movable track member and a seatback member mounted on the seat cushion member for forward folding about a seatback pivot axis between a substantially upright occupiable design position and a substantially horizontal load supporting position. A seatback member latch means is operatively engaged between the seatback member and the seat cushion member to selectively control the forward folding of the seatback member. A link arm member has an upper end and a lower end and is operatively mounted adjacent its upper end on the seatback member, for movement with the seatback member between a lowered track engagement position corresponding to the substantially horizontal load supporting position of the seatback member, and a raised track clearing position corresponding to the substantially upright occupiable design position of the seatback member. A link engaging portion is disposed on the fixed track member for receiving the lower end of the link arm member when the seat assembly is in a predetermined rear longitudinal position. When the link arm member is in the lowered track engagement position, and only then, the link arm member interacts with the link engaging portion of the fixed track member to permit the forward folding of the seatback member to the substantially horizontal load supporting position and to thereat preclude longitudinal motion of the seat assembly relative to the fixed track member, so as to retain the seat assembly is in the predetermined rear longitudinal position.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described herein below.

BRIEF DESCRIPTION OF THE DRAWINGS

The novel features which are believed to be characteristic of the fold flat vehicle seat according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings, references to the front, rear, left and right are from the perspective of an occupant of the seat shown.

DETAILED DESCRIPTION OF A PREFERRED EMBODIMENTS

Figure 1:
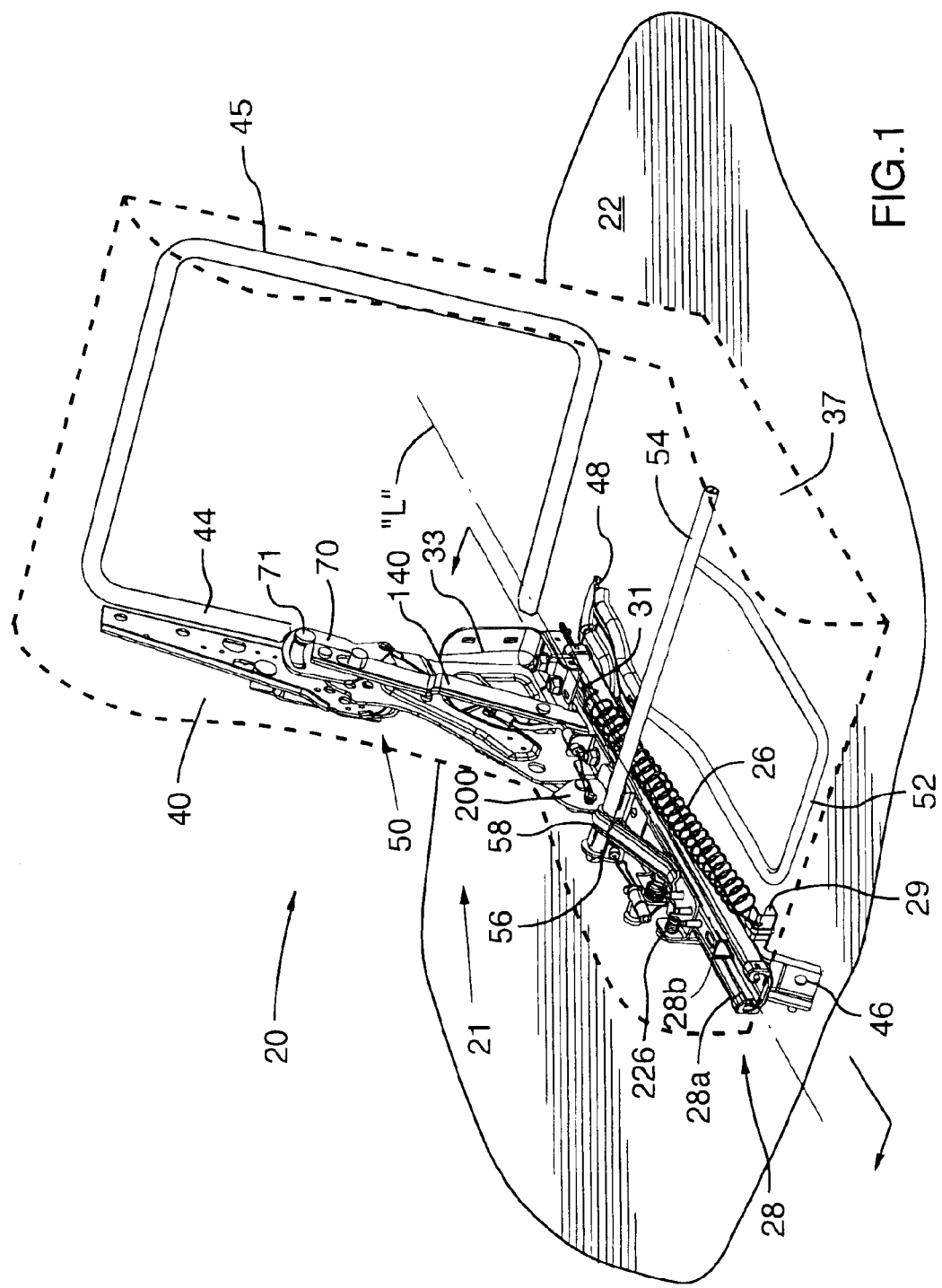
FIG. 1 is a perspective view from the front left of a fold flat vehicle seat according to the present invention, showing the seat cushion member and the seatback member in dashed lining, with the seatback member in a substantially upright occupiable design position.
Figure 2:
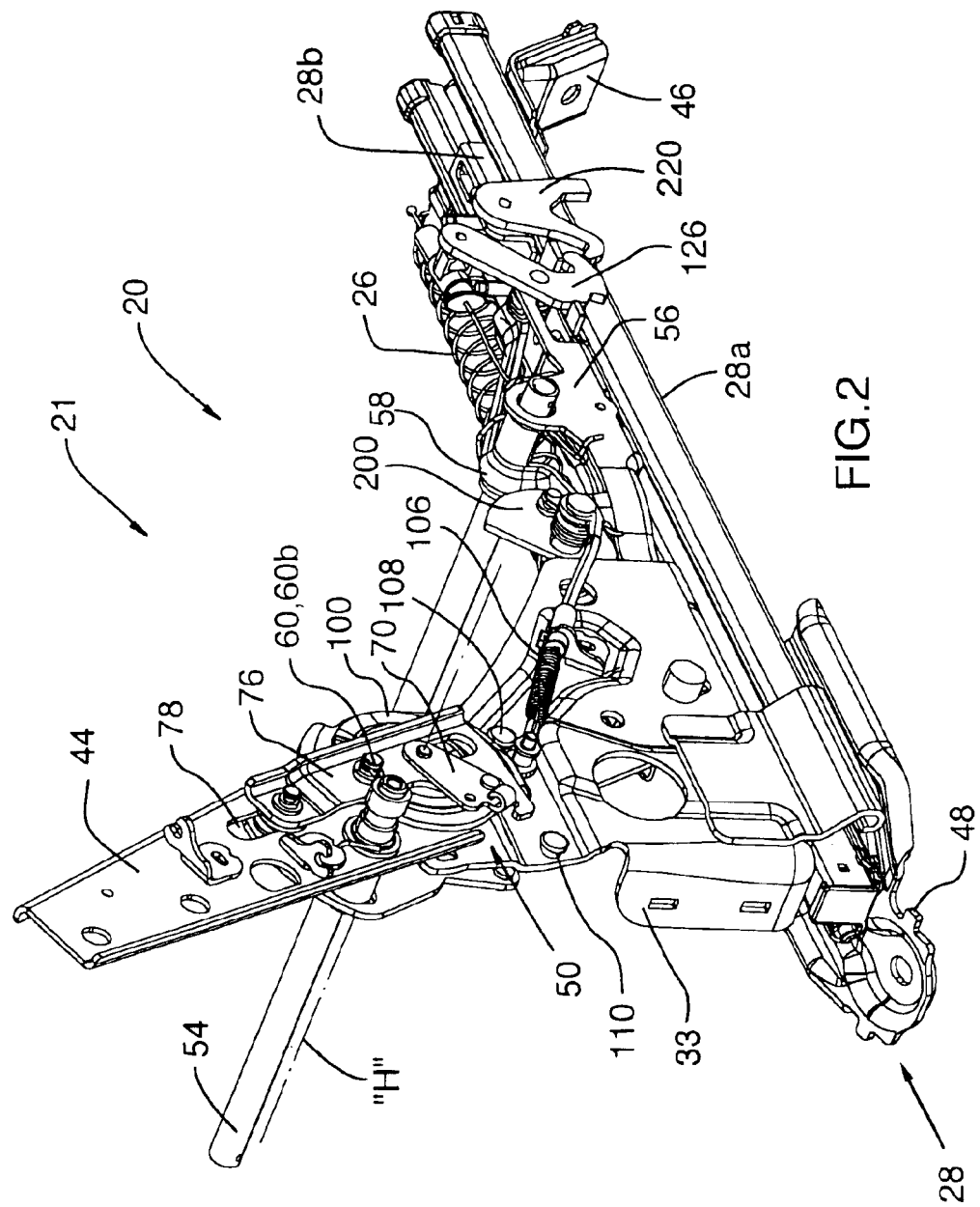
FIG. 2 is a perspective view from the rear right of the right half of the fold flat vehicle seat of FIG. 1.

Reference will now be made to FIGS. 1 through 19, which show a first preferred embodiment of the fold flat vehicle seat of the present invention, as indicated by general reference numeral 20.

In FIGS. 1 through 19 of the drawings, there is shown a preferred embodiment of fold flat vehicle seat 20 in its substantially upright design configuration and having an "E-Z entry" feature, as will be described in greater detail subsequently. The overall track assembly and the "E-Z entry" system are described in more detail in U.S. Pat. No. 6,336,679, issued Jan. 8, 2002, the teaching of which patent are incorporated herein by reference. The fold flat vehicle seat 20 is installed on a vehicle floor 22 (partially shown in FIG. 1) of a vehicle (not shown). The seat assembly 21 is mounted on right hand track assembly 28 and left hand track assembly (not shown), which track assemblies per se are of a prior art design, as shown in U.S. Pat. No. 6,336,679. The seat track assemblies may be used to adjust the position of the entire seat assembly 21 in the forward (i.e., to the front of the vehicle, and to the left of FIG. 1) and aft (i.e., to the rear of the vehicle, and to the right of FIG. 1) directions.

The right hand track assembly 28 and left hand track assembly (not shown) are, as is well known in the art, similar in structure, and accordingly, for clarity and ease of description, only the right hand side 28 track assembly and its related structures will be specifically referenced hereafter.

The right hand track assembly 28 is secured to the vehicle floor 22 by front floor mounting bracket 46 and rear floor mounting bracket 48. The seat track assembly 28 has a fixed (lower) track member 28a that is affixed to the vehicle floor 22 by means of threaded fasteners (not shown) extending in a conventional manner through the front and rear floor mounting brackets 46, 48.

As part of the track assembly 28, the fold flat vehicle seat 20 also comprises a movable track member 28b slidably engaging the fixed track member 28a for longitudinal sliding movement of the movable track member 28b relative to the fixed track member along a longitudinal axis "L". The movable track member 28b has the seat assembly 21 mounted thereon in a conventional manner for longitudinal sliding movement of the seat assembly 21 relative to the fixed track member along the longitudinal axis "L". In this manner, the seat assembly 21 is adjustable fore and aft to a selected position, also known as a comfort position. As indicated by arrow "A" in FIG. 6, the seat assembly 21 has been moved forwardly from the design position shown in FIG. 5, to the comfort position shown in FIG. 6.

A known track lock means, as indicated by general reference numeral 32, is operatively interconnected between the movable track member and the fixed track member. The track lock means 32 is movable between a locked configuration, as can be best seen in FIGS. 1 through 9 and 16, and a released configuration, as can be best seen in FIGS. 10 through 15 and 17 through 19. In the locked configuration, the movable track member 28b is precluded from moving longitudinally relative to the fixed track member 28a, to thereby fix the seat assembly 21 in a selected longitudinal position. In the released configuration, the movable track member 28b is permitted to move longitudinally relative to the fixed track member 28a.

Figure 7:
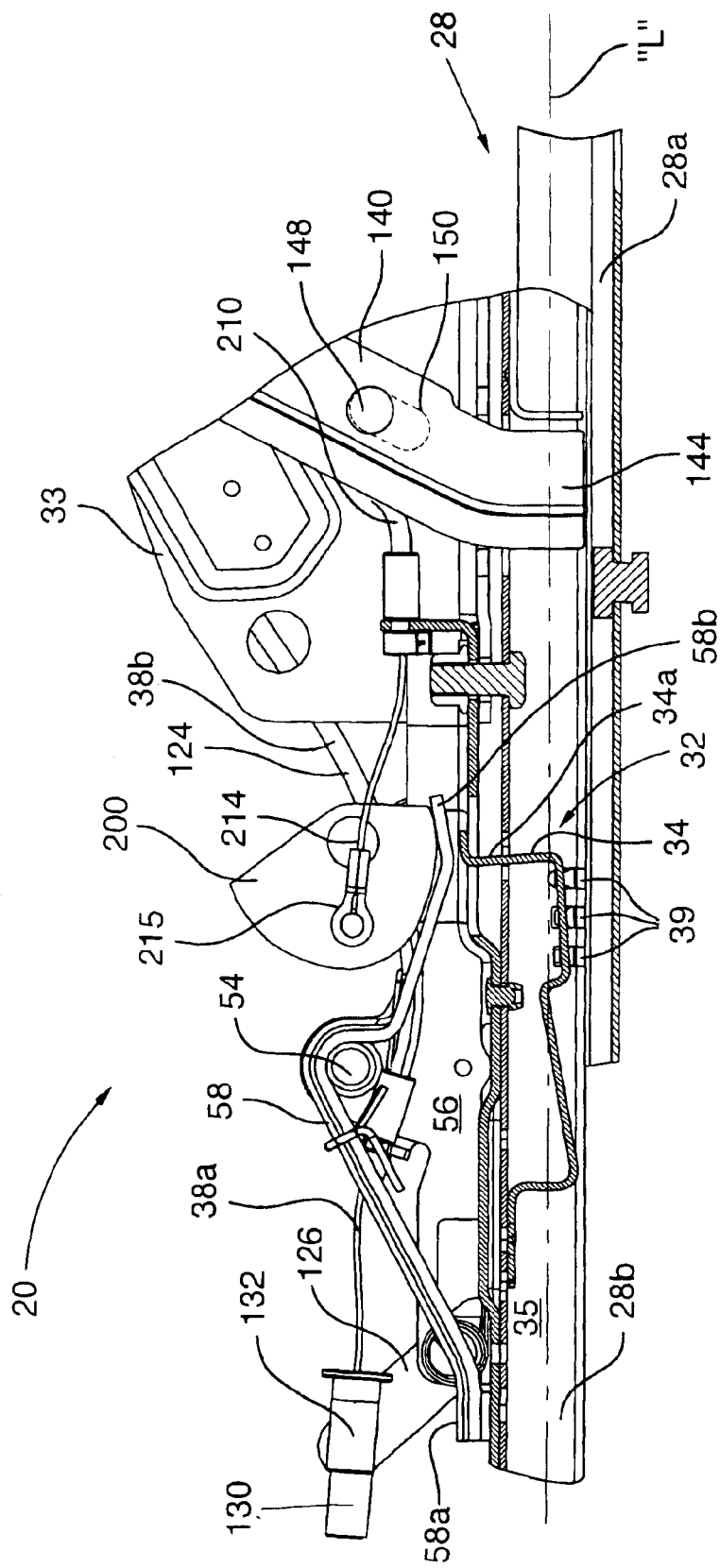
FIG. 7 is an enlarged cross-sectional side elevational view of a portion of the fold flat vehicle seat as shown in FIG. 6.
Figure 11:
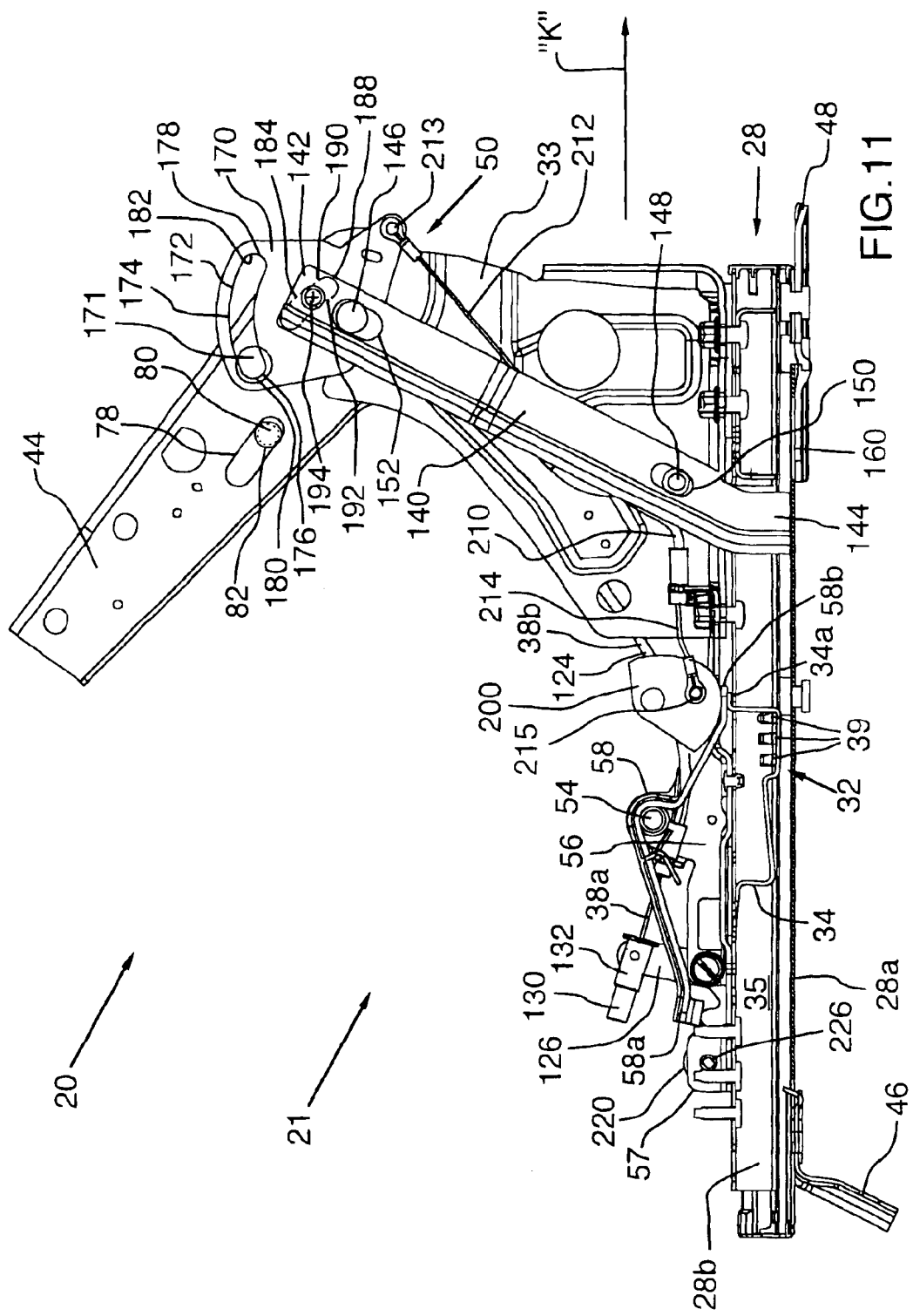
FIG. 11 is a cross-sectional left side elevational view similar to FIG. 10, but with the seat assembly being slid rearwardly towards its predetermined rear longitudinal position.
Figure 12:
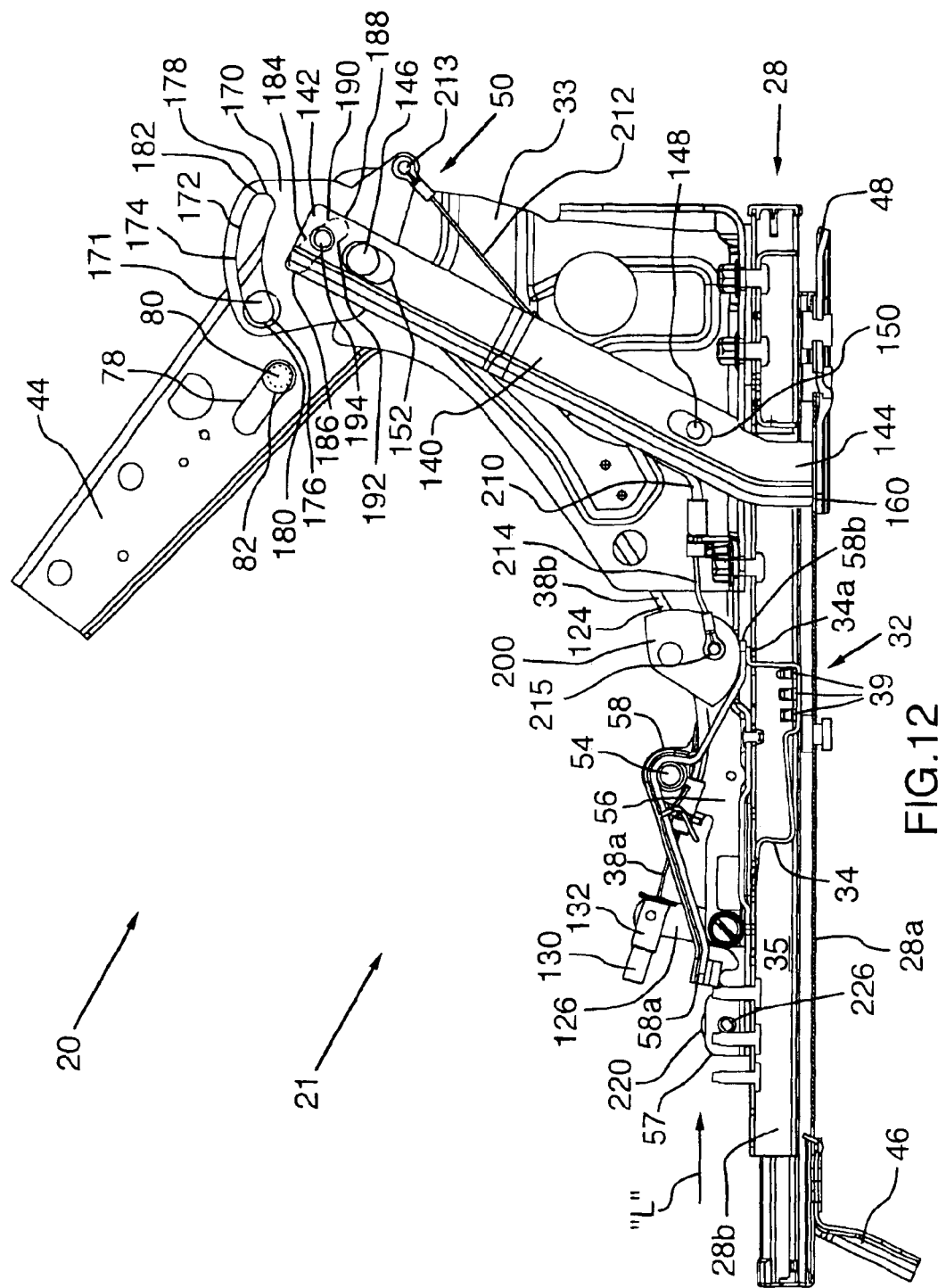
FIG. 12 is a cross-sectional left side elevational view similar to FIG. 11, but with the seat assembly having reached its predetermined rear longitudinal position, and before the link arm member moves downwardly to its lowered track engagement position.
Figure 13:
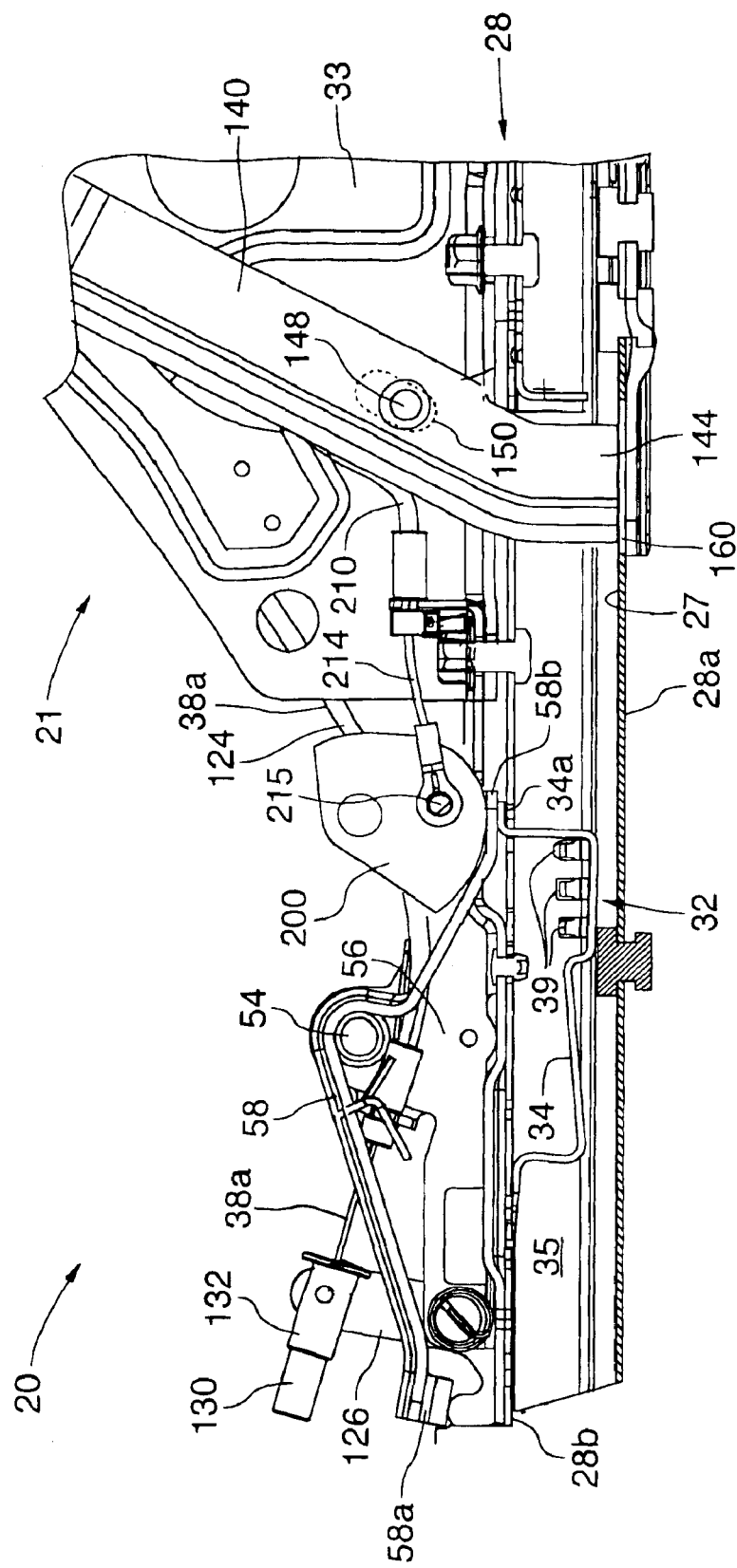
FIG. 13 is an enlarged cross-sectional side elevational view of a portion of the fold flat vehicle seat as shown in FIG. 12, specifically showing the link arm member just before it moves downwardly to its lowered track engagement position.
Figure 14:
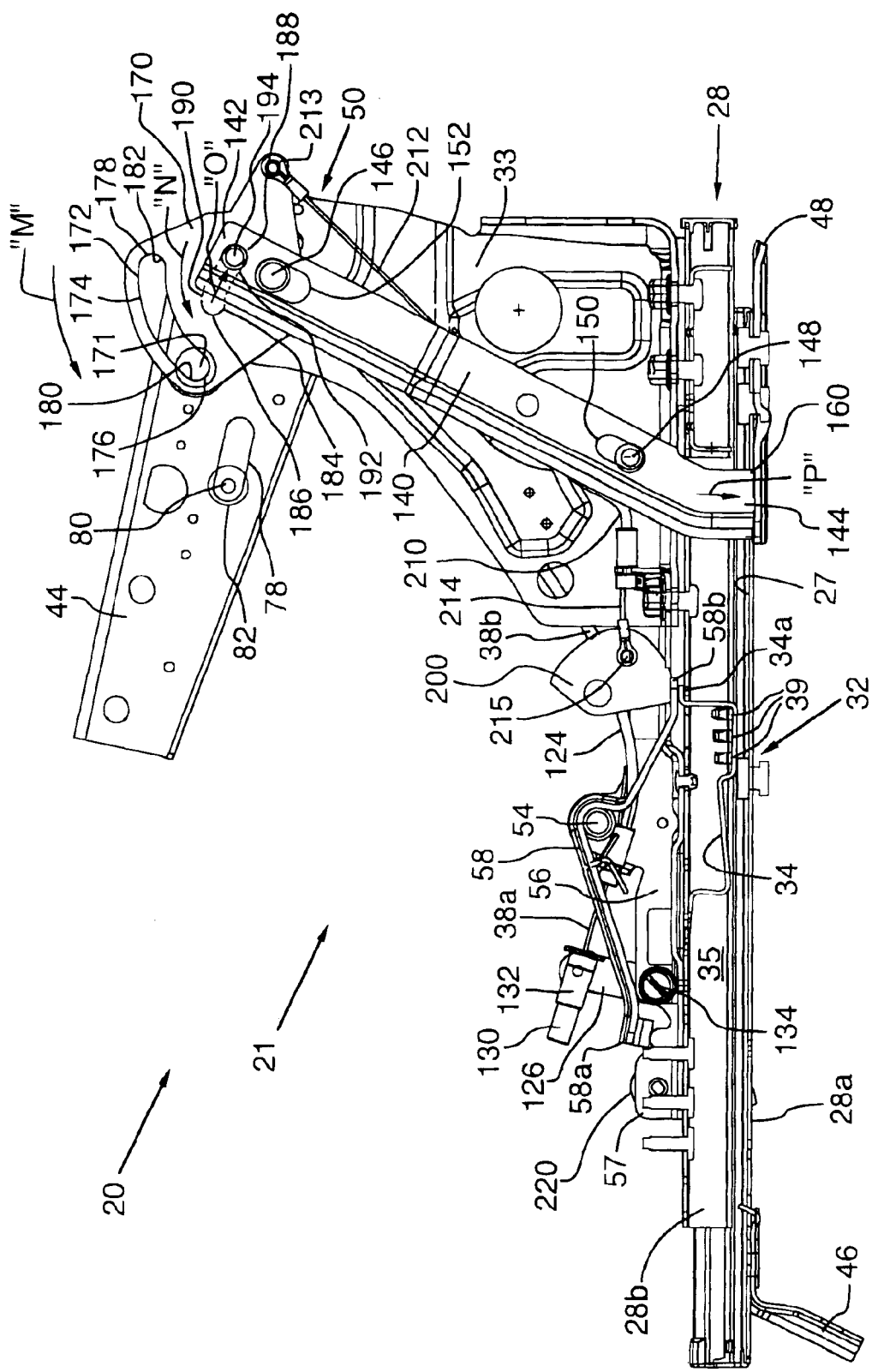
FIG. 14 is a cross-sectional left side elevational view similar to FIG. 12, but with the link arm member having moved downwardly to its lowered track engagement position.
Figure 15:
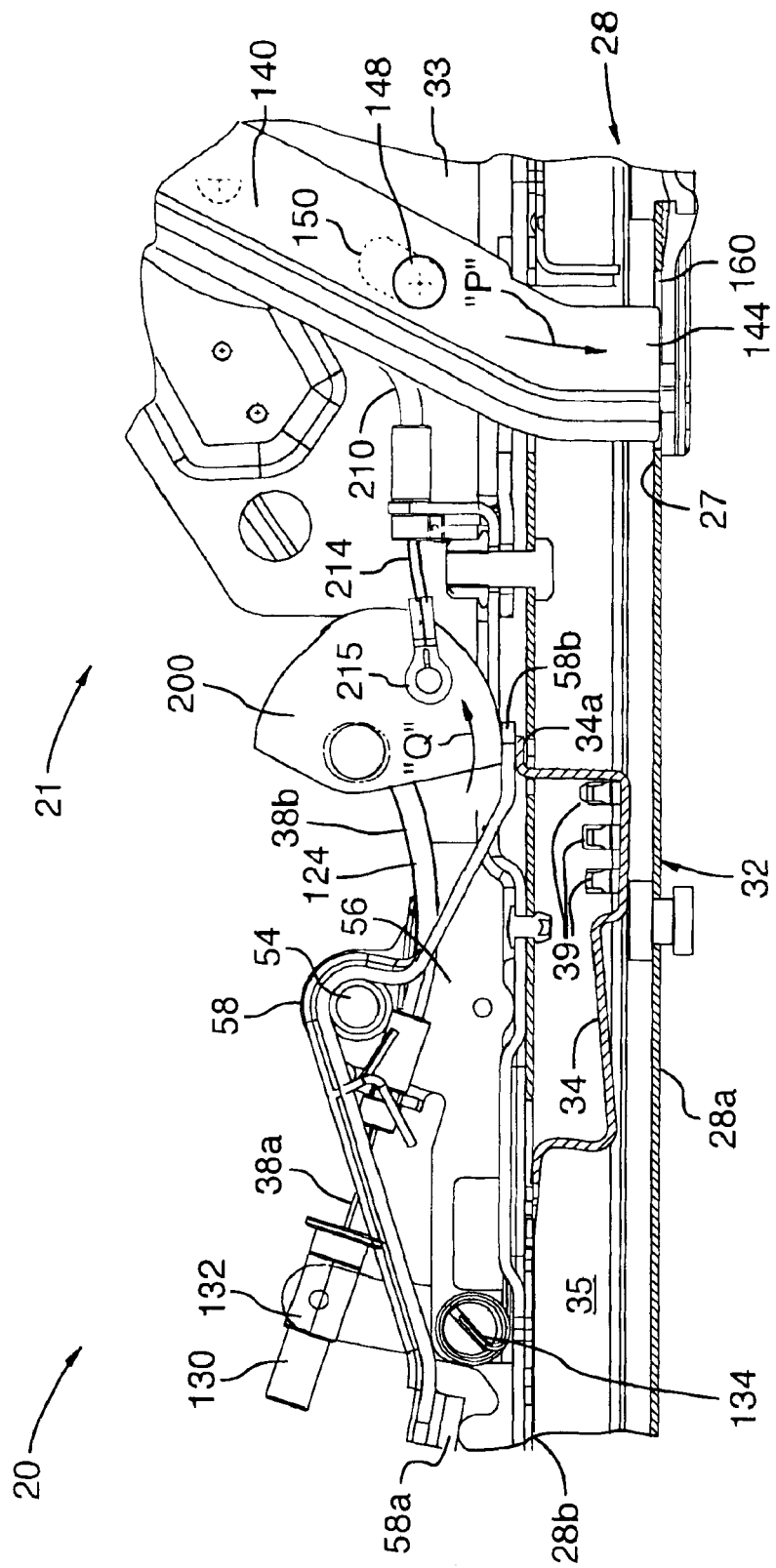
FIG. 15 is an enlarged cross-sectional left side elevational view of a portion of FIG. 14, specifically showing the link arm member in its lowered track engagement position.

As can be best seen in FIGS. 5 through 7, 9 through 15, and 19, the track lock means 32 includes a track lock actuator member 34 positioned within a cavity 35 defined between the fixed track member 28a and the movable track member 28b, for operative engagement with the teeth 39 of the track lock means 32. The track lock actuator member 34 has an upper portion 34a that protrudes upwardly through the movable track member 28b (as best seen in FIGS. 7, 13 and 15). When the track lock actuator member 34 is in a raised position, as can be best seen in FIG. 7, the track lock actuator member 34 engages the teeth 39 to lock the movable track member 28b with respect to the fixed track member 28a. When the track lock actuator member 34 is pushed downwardly to a released position, as best seen in FIGS. 13 and 15, it is removed from engaging the teeth 39, and the movable track member 28b and the seat assembly 21 are permitted to slide longitudinally with respect to the fixed track member 28a.

The track lock means 32 may be unlocked by lifting on a handlebar member 52 pivotally mounted by means of a crossbar member 54 on a mounting bracket 56. A rocker arm 58 is secured to the crossbar member 54 for rotation therewith. The back end portion 58b of the rocker arm 58 pushes downwardly on the upper portion 34a of the track lock actuator member 34, to move the track lock actuator member 34 downwardly, to thereby release the track lock actuator member 34 from the teeth 39.

The seat track assembly 28 preferably has a biasing coil spring 26, operatively interconnected between a bracket 29 rigidly mounted on the fixed track member 28a and a spring attachment bracket 31 rigidly mounted on the movable track member 28b. Release of the track lock means 32 allows the tensile force in spring 26 to pull the movable track member 28b forward relative to fixed track member 28a, thereby causing the seat assembly 21 to move forward as described above, when the track lock means 32 is released. It will be understood that other, mechanically equivalent known track assemblies may be used within the scope of the present invention.

The seat assembly 21 includes a seat cushion member 30 mounted on the right movable track member 28b and the left movable track member (not shown). More specifically, the seat cushion member 30 includes a right seat cushion bracket 33 rigidly mounted to the movable track member 28b and a left seat cushion bracket (not shown) rigidly mounted to the left movable track member (not shown). A seat cushion frame member has been omitted from all views for ease of illustration, but such seat cushion frame member is conventionally mounted to each of the seat cushion brackets, as is well known in the art, so as to provide a platform base for mounting of the seat cushioning 37 shown in phantom outline in FIG. 1.

The fold flat vehicle seat 20 shown in the Figures also includes a seatback member 40 having a frame member 42 rigidly attached at opposite lateral sides to right seatback mounting bracket 44 and the left seatback mounting bracket (not shown), which brackets are mirror images of one another. Cushioning material 45 of the seatback member 40 have generally been omitted from the figures for ease of illustration, but are conventionally mounted on the seatback frame member 42, and are shown in phantom outline in FIG. 1.

The seatback member 40 is mounted on the seat cushion member 30 for forward folding about a substantially horizontal seatback pivot axis "H" (See FIG. 2) between a substantially upright occupiable design position, as is best seen in FIGS. 1 through 8, and 16, and a substantially horizontal load supporting position, as is best seen in FIGS. 14 and 15.

More specifically, in the preferred embodiment illustrated, the right seatback mounting bracket 44 is mounted on the seat cushion member 30 by means of a known rotary recliner 50 operable between locked and unlocked configurations to selectively control pivotal movement of the seatback member 40 relative to the seat cushion member 30 about the substantially horizontal seatback pivot axis "H" upon locking and unlocking of the rotary recliner 50, as controlled through manual manipulation of first lever handle 72a. The rotary recliner 50 is also of known design, and can, for example, be of the same general type as described in U.S. Pat. No. 5,779,313, issued Jul. 14, 1998, the teachings of which patent are also hereby incorporated herein by reference. While other types of known rotary recliners have utility in this type of application, a specific form of rotary recliner shown and suitable for this application is available from Faurecia North America, of Troy, Mich., as Discontinuous Round Recliner Part No. 499202

(for right-handed applications) or Part No. 4999203 (for left-handed applications). A right-handed application, only, is shown, with a single rotary recliner 50 being utilized on the right hand side of the seat assembly 21.

A seatback member latch means is incorporated into the rotary recliner 50 and is operatively engaged between the seatback member 40 and the seat cushion member 30 to selectively control the forward folding of the seatback member 40 over the seat cushion member 30. The seatback member latch means includes an internal spring means (not shown) within the rotary recliner 50 biases the internal locking components of the rotary recliner 50,towards the locked configuration of the recliner 50, at which locked configuration the attached right seatback mounting bracket 44 is unable to rotate about the substantially horizontal seatback pivot axis "H".

Figure 17:
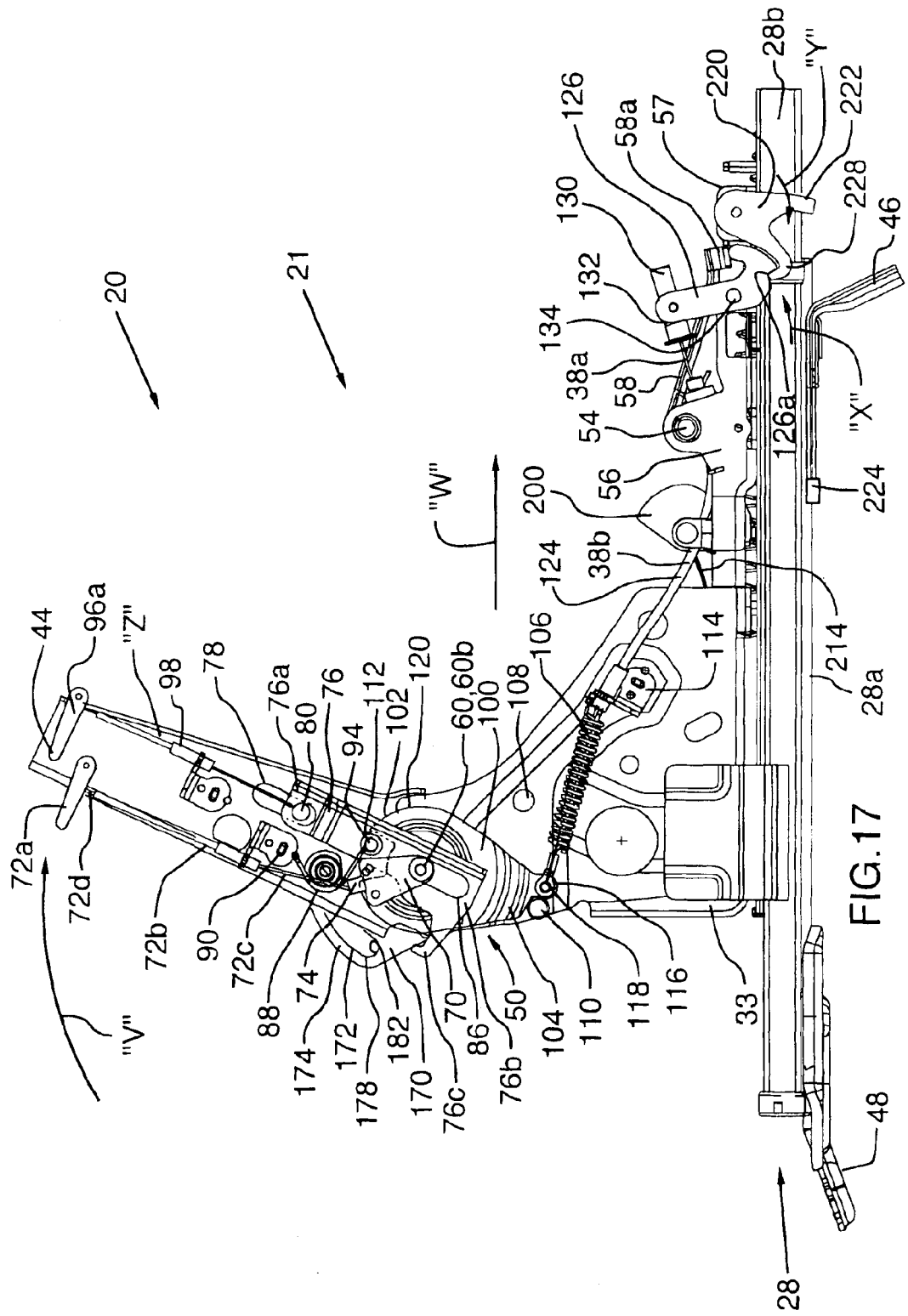
FIG. 17 is a right side elevational view similar to FIG. 16, but with the track lock having been released and the seat assembly in its "E-Z entry" position, forward of the upright design position shown in FIG. 16.
Figure 18:
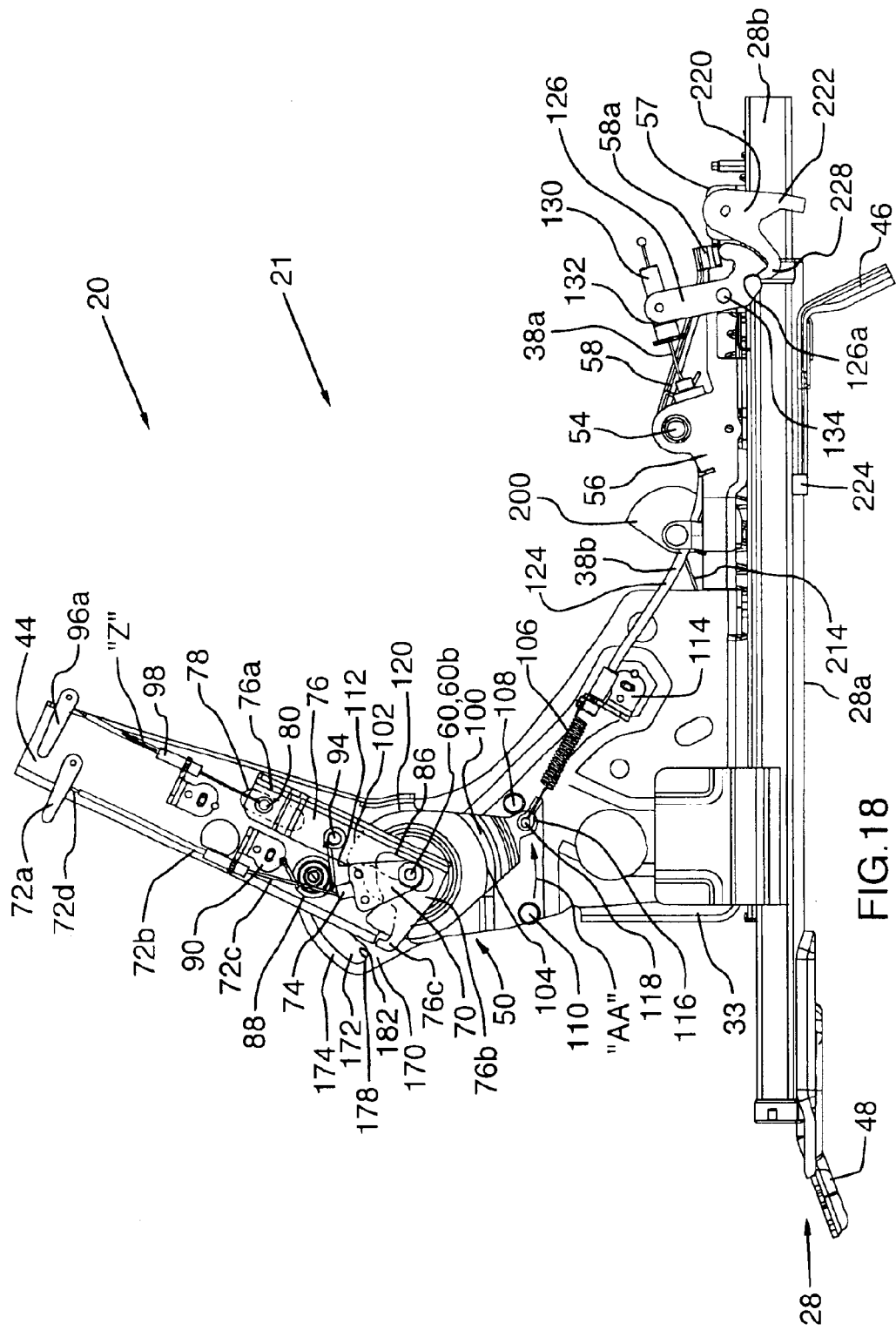
FIG. 18 is a right side elevational view similar to FIG. 17, but with the forward (i.e.: second) lever handle having been lifted to release the rotary recliner, to thereby permit movement of the seat assembly to the substantially horizontal load supporting position; and, FIG. 19 is a left side elevational view of the seat assembly of FIG. 18 in its "E-Z entry" position.
Figure 19:
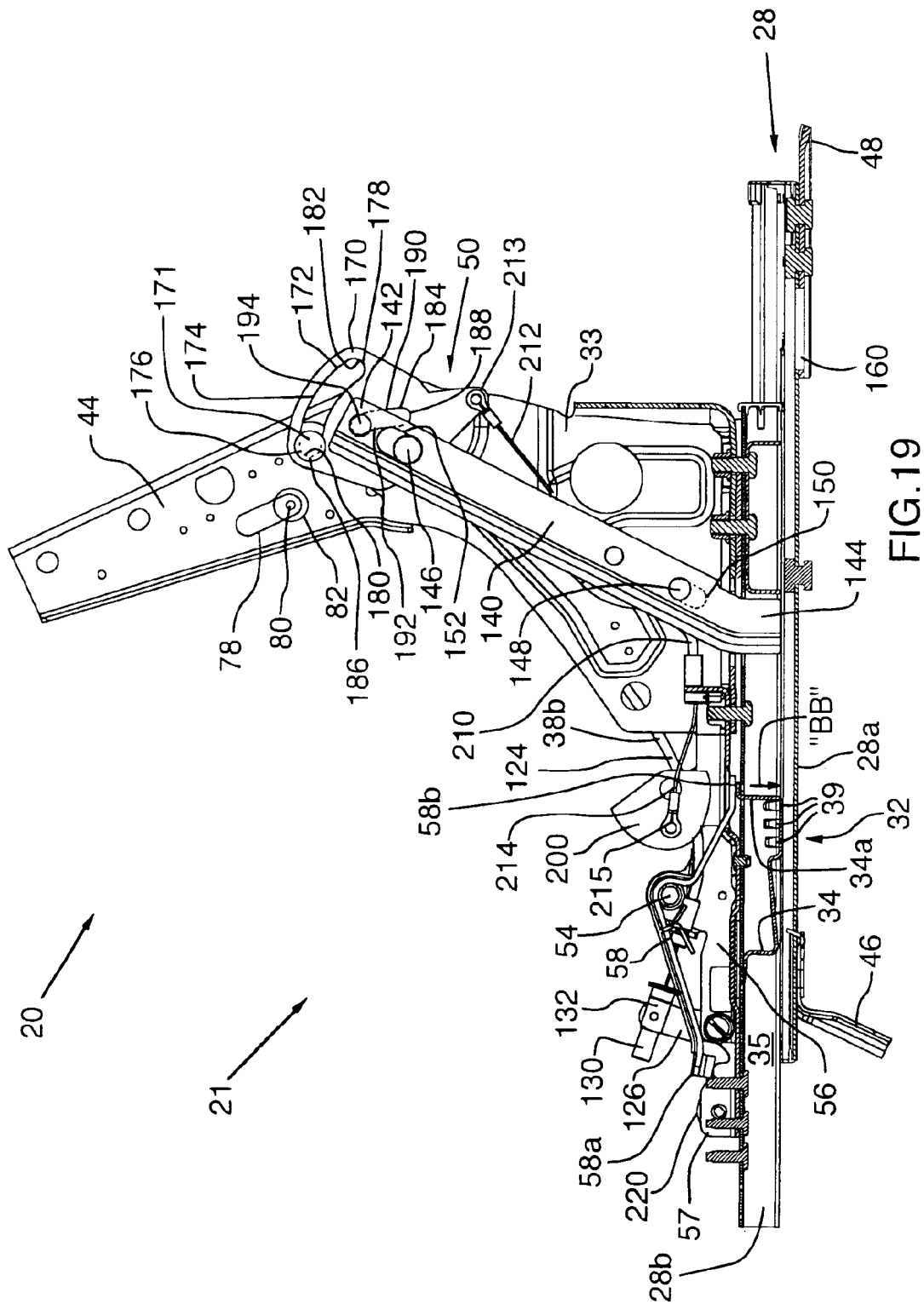

The preferred embodiment of the seatback member 40 has a forwardly tilted easy entry position, which is well known in the industry as an "E-Z entry" position, and is shown in FIGS. 17 through 19. In the "E-Z entry" position, the seatback member 40 is partially forwardly folded over the seat cushion member 30 such that the seatback member 40 is disposed angularly between the substantially upright occupiable design position and the substantially horizontal load supporting position to facilitate ingress and egress to and from behind the seat assembly. Further, co-incident with said partial forward folding of the seatback member 40 during activation of the "E-Z entry" mode, the track lock means 32 has moved to its released configuration, as will be described in greater detail subsequently, to permit the longitudinal sliding movement of the movable track member 28b and the seat assembly 21 relative to the fixed track member 28a with the biasing assistance of the coil spring 26.

In order to activate the "E-Z entry" mechanism, the first lever handle 72a is used. The lever handle 72a is pivotally mounted on the seatback member 40 for indirect control of the control crank member 70, via a Bowden type sheathed cable 72b. A second end 72c of the Bowden cable 72b is connected to a hook portion 74 positioned on the recliner control crank member 70, and the opposite other first end 72d of the Bowden cable 72b is connected to the lever handle 72a for pulling activation thereof upon downward movement of the lever handle 72a, thereby to cause selective movement of the recliner control crank member 70 between the first (locked) and second (unlocked) crank positions against the biasing of the internal spring (not shown) within the rotary recliner 50.

An elongate link member 76, having opposed first 76a and second 76b ends, is connected adjacent said first end 76a to the seatback member 40 for sliding movement between first and second link positions as follows. The first end 76a of the link member 76 is preferably connected to the seatback member 40 by means of an elongate slot 78 formed in the seatback mounting bracket 44. A guide pin 80 is rigidly attached to the link member 76 adjacent the first end 76a of the link member 76, which guide pin 80 extends through the elongate slot 78 of the seatback mounting bracket to an enlarged inboard pin end 82 to retain the guide pin 80 in said elongate slot 78 upon said sliding movement of the link member 76.

Figure 3:
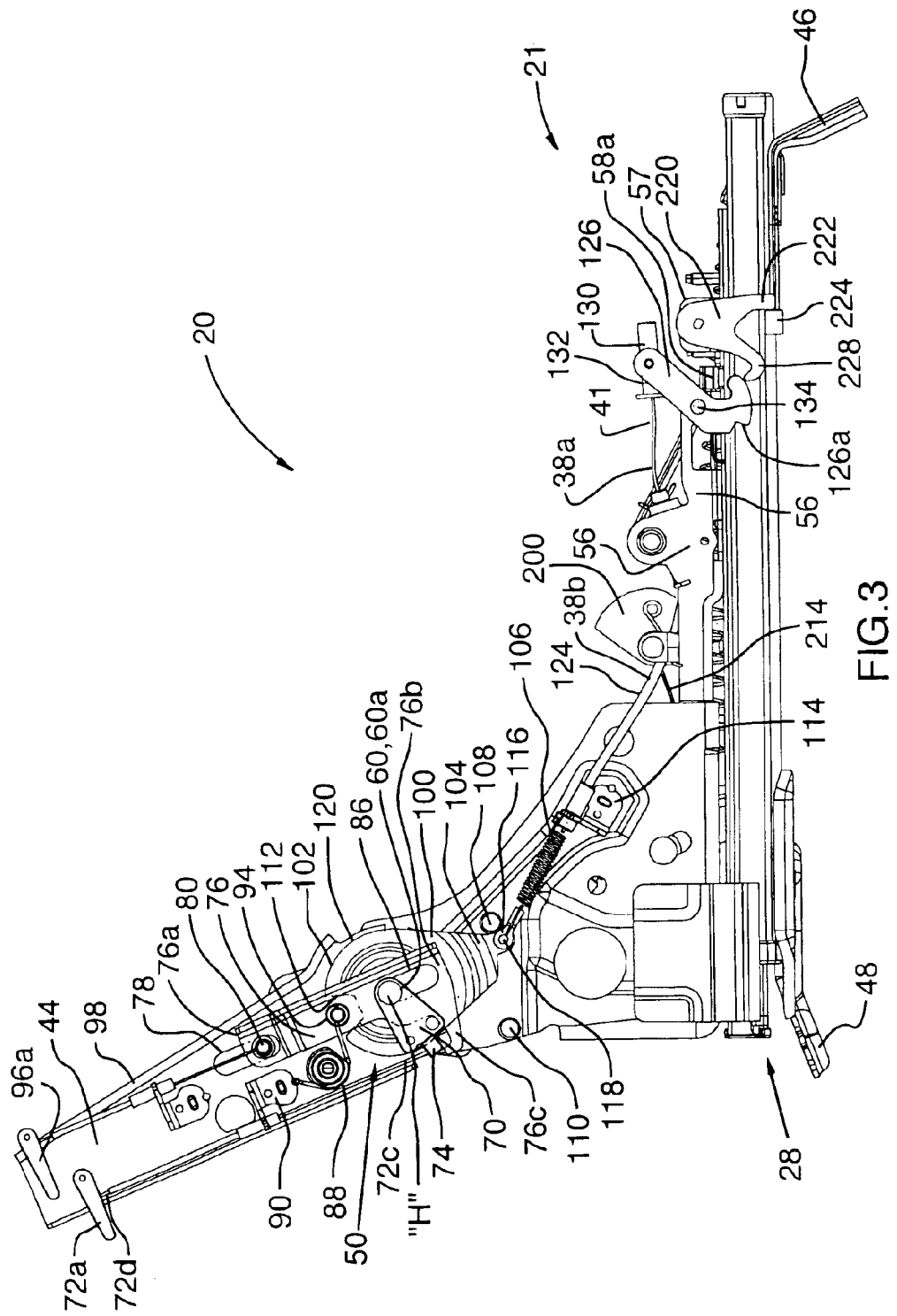
FIG. 3 is a right side elevational view of the right half of the fold flat vehicle seat of FIG. 1.
Figure 8:
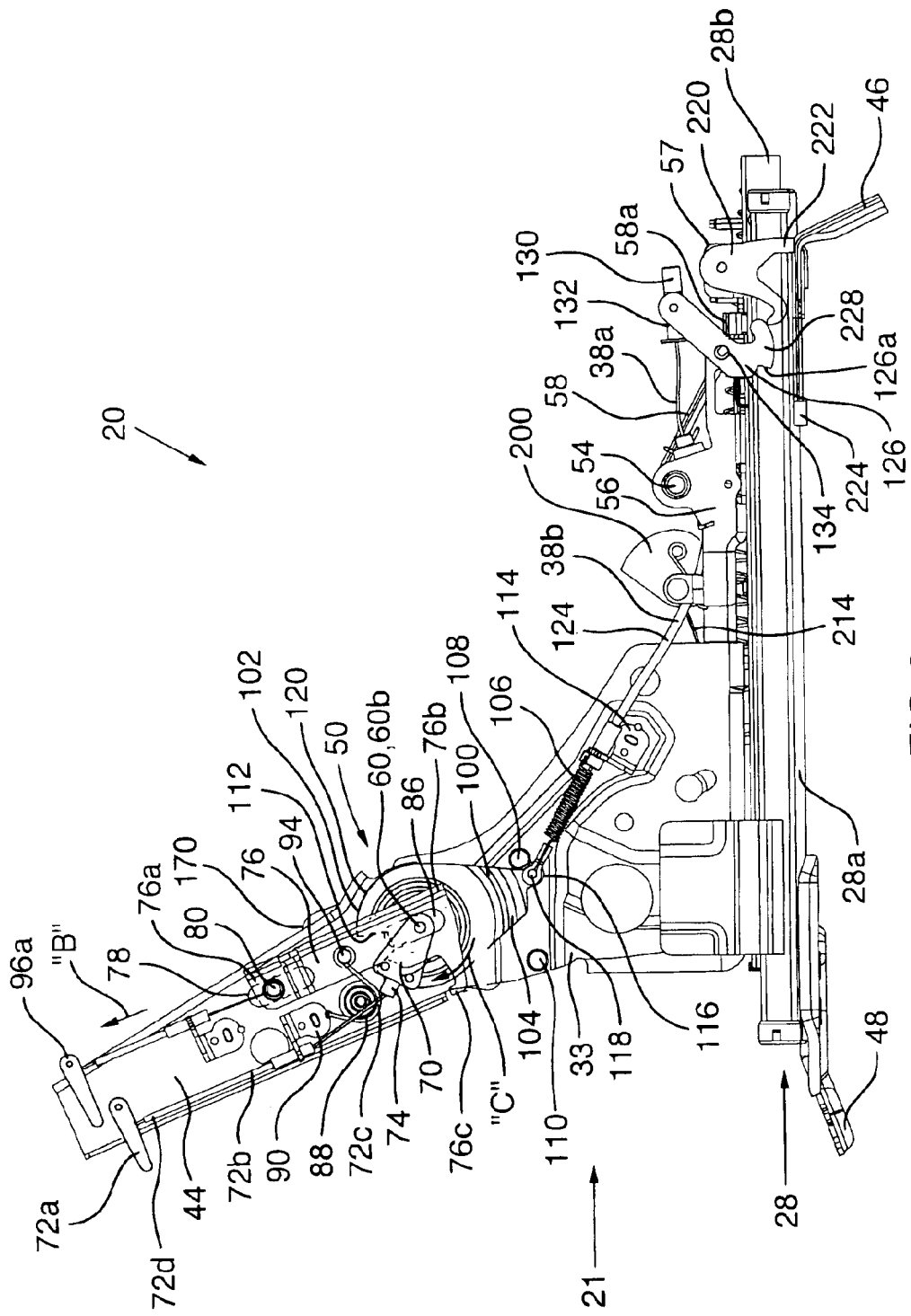
FIG. 8 is a right side elevational view similar to FIG. 6, but with the seat assembly in a forward comfort position and the second (i.e.: the forward) lever handle having been lifted to release the rotary recliner, to thereby permit movement of the seat assembly to the substantially horizontal load supporting position.
Figure 16:
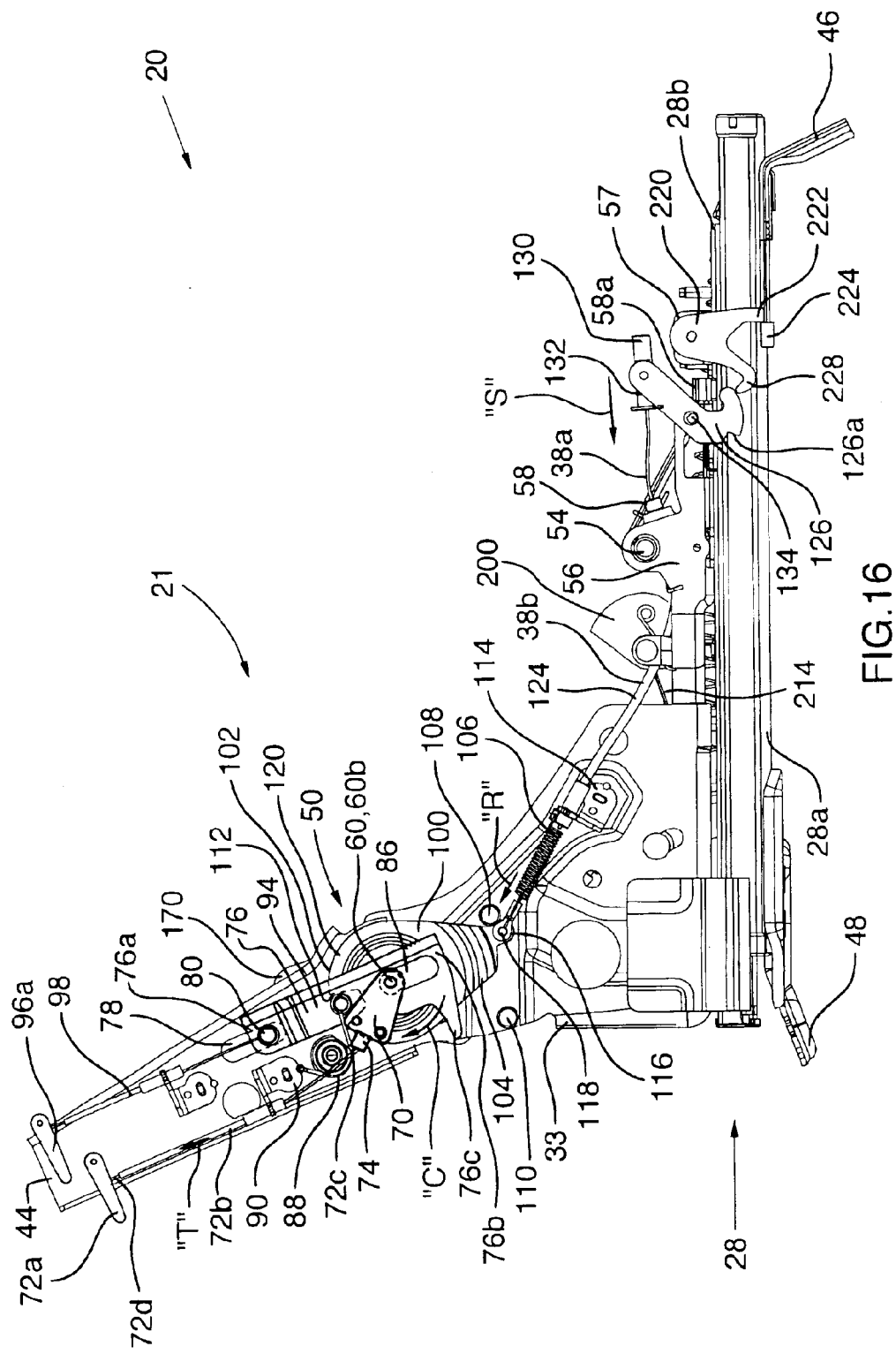
FIG. 16 is a right side elevational view similar to FIG. 3, but with the first (i.e.: rearward) lever handle being lifted in order to release the rotary recliner and to effect the "E-Z entry" feature.

The link member 76 is connected adjacent its second end 76b about a pivot point defined by the central axis of the control shaft 60 by means of an elongate slot 86 formed in the link member 76. The control shaft 60 passes through the elongate slot 86 so as to be pivotally movable with respect to the link member 76, and for rigid attachment as aforesaid of its outboard free end 60b to the recliner control crank member 70. In this manner, the second end 76b of the elongate link member 76 is connected to a pivot point on the control shaft 60 for pivotal movement around the substantially horizontal seatback pivot axis "H" concurrent with pivotal movement of the seatback member 40 relative to the seat cushion member 30, and for sliding movement of the link member 76 transverse to the substantially horizontal seatback pivot axis "H", between a lower position, as best seen in FIG. 3, and an upper position as best seen in FIGS. 8 and 16.

A torsion spring 88 biases the link member 76 towards the lower position. The torsion spring 88 is operatively attached at one of its ends end to a backrest bracket 90, and at its other end to a cam pin 94 rigidly mounted on the link member 76 proximate to its mid-section.

The link member 76 has a transversely extending foot portion 76c adjacent its second end 76b, which foot portion 76c is dimensioned and otherwise adapted to engage the recliner control crank member 70 upon said sliding movement of said link member 76 from its lower position to its upper position. When the link member 76 has moved to its upper position, the recliner control crank member 70 is moved to its second crank position, thus unlocking the rotary recliner 50, and thereby allowing the seatback member 40 to pivot about the substantially horizontal seatback pivot axis "H".

An interlock plate 100 is mounted on the seat cushion member 30 in rotatable relation to the substantially horizontal seatback pivot axis "H" for rotation with the seatback mounting bracket 44 between a first rotational limit position corresponding to the substantially upright occupiable design position and a second rotational limit position corresponding to the "E-Z entry" position of the seatback member 40. In the first rotational limit position, the front edge of a lower leg portion 104 of the interlock plate 100 contacts a first stop pin 108 rigidly mounted on the seat cushion bracket 33. In the second rotational limit position, the rear edge of the lower leg portion 104 of the interlock plate means 100 contacts a second stop pin 110 rigidly mounted on the seat cushion bracket 33. The interlock plate 100 is biased towards its first rotational position by means of a coil spring 106 interconnected between a bracket 114 attached to the seat cushion bracket 33 and the lower leg 104 of the interlock plate 100, the latter connection being through a mounting eye 116 pivotally attached to a mounting stud 118, rigidly attached to the lower leg 104 of the interlock plate 100.

The interlock plate 100 has a top edge 102 which defines a convexly arcuate cam pin follower surface 120 having a camming shoulder 112.

The cam pin 94 is mounted, as previously described, on the link member 76 for driving engagement with the camming shoulder 112, to cause the aforementioned rotation of the interlock plate 100 from the first rotational limit position to the second rotational limit position upon forward pivotal movement of the seatback member 40.

A second Bowden type sheathed cable generally designated by reference numeral 124, is interconnected between the interlock plate 100 and the track lock means 32 for unlocking the track lock means 32 when the interlock plate 100 is rotated, toward its second rotational limit position. The second Bowden type sheathed cable has an outer fixed sheath portion 38b and an inner cable portion 38a operatively sliding therein.

The first end 41 of the Bowden cable is fitted with a cylindrically shaped connector member 130 having a laterally projecting connection socket portion 132 that pivotally connects to a lever arm 126. The lever arm 126 is pivotally mounted, by means of a pivot pin 134, on an upwardly bent portion of a large mounting bracket 56 secured to the movable track member 28b, for movement between a releasing position whereat the first lever arm 126 causes the track lock means 32 to move to the released configuration and a locking position whereat the first lever arm 126 permits the track lock means 32 to move to the locked configuration. Thus, forward folding movement of the seatback member 40 a threshold distance from its substantially upright occupiable design position toward its substantially horizontal load supporting position causes the first lever arm 126 to move correspondingly from its locking position to its releasing position. Such forward folding of the seatback member 40 causes pulling movement of the inner cable portion 38a in the direction of arrow "R" of FIG. 16 causes the connector member 130 to move in the direction of arrow "S" of that Figure, which in turn, causes pivotal movement of the lever arm 126 about pivot pin 134 in the direction of arrow "X" in FIG. 17. Such pivotal movement causes the lever arm 126 to lift a forward end 58a of the rocker arm 58, which causes a rearward end 58b of the rocker arm 58 to move downwardly in the direction of arrow "BB" of FIG. 19. This downward movement of the rearward end 58b of the rocker arm 58 causes the track lock means 32 to move to its released configuration, in the manner previously disclosed.

It will also be appreciated that if a second lever handle 96a is released by a user while the seatback member 40 is in its "E-Z entry" position, the coil spring 106 will return the interlock plate 100 to its first rotational limit position.

In order to fold the seatback member 40 fully forwardly to its substantially horizontal load supporting position, a manually manipulable second lever handle 96a is used, as is best seen in FIGS. 8 and 18. The manually manipulable second lever handle 96a is pivotally mounted on the seatback member 40 for indirect control by a user of the link member 76, via a Bowden type sheathed cable 98, for selective movement of the link member 76 between its lower and upper positions against the biasing of the torsion spring 88 upon pivotal movement of the lever handle member 96a from a lower rest position, as best seen in FIG. 3, and a raised actuating position, as best seen in FIGS. 8 through 18.

When the link member 76 is in its upper position, as will occur when the lever handle 96a is moved upwardly, the cam pin 94 will clear the camming shoulder 112, thereby avoiding any rotation of the interlock plate 100 from its first rotational limit position. In this manner, the seatback member 40 can be forwardly folded to its substantially horizontal load supporting position.

Figure 4:
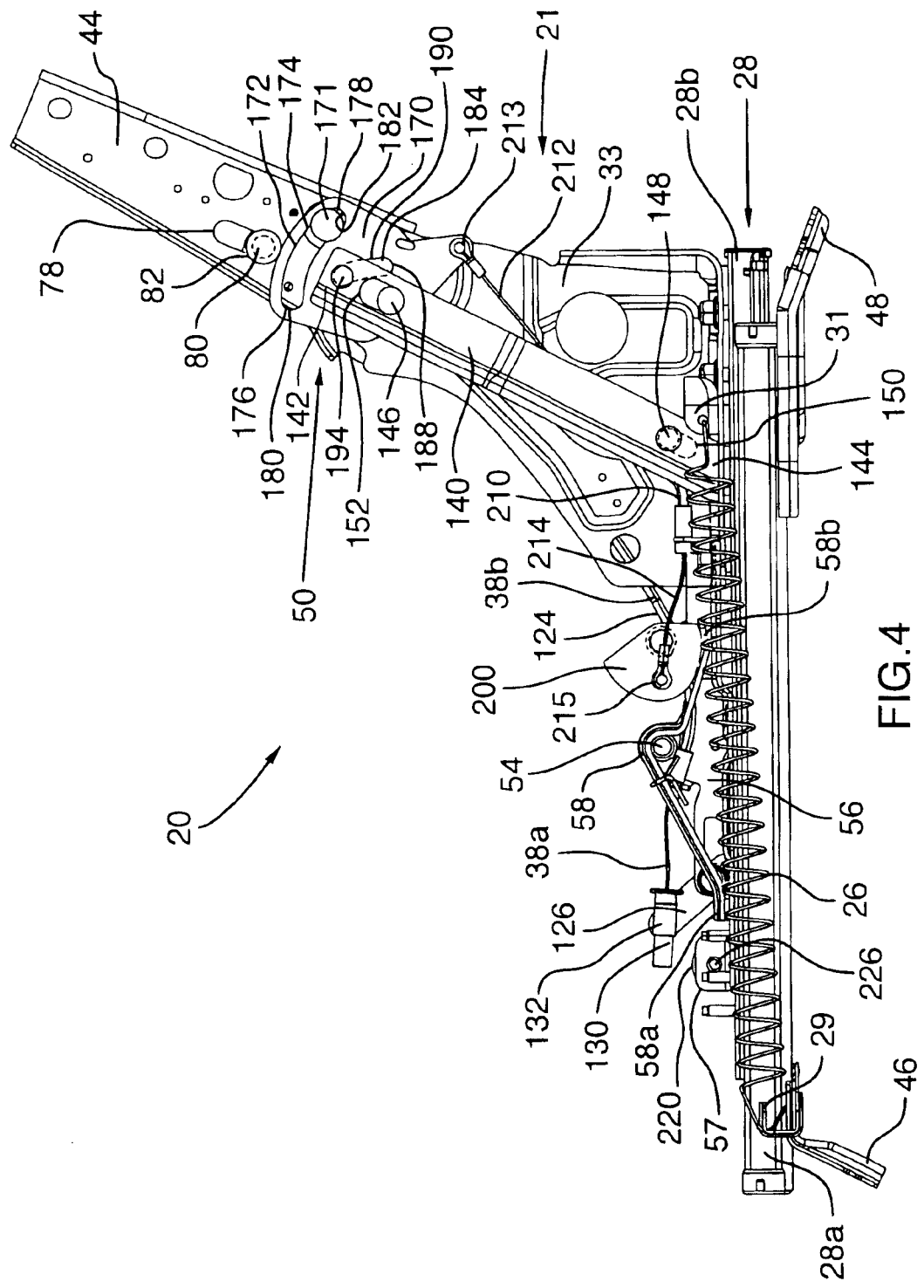
FIG. 4 is a left side elevational view of the right half of the fold flat vehicle seat of FIG. 1.
Figure 5:
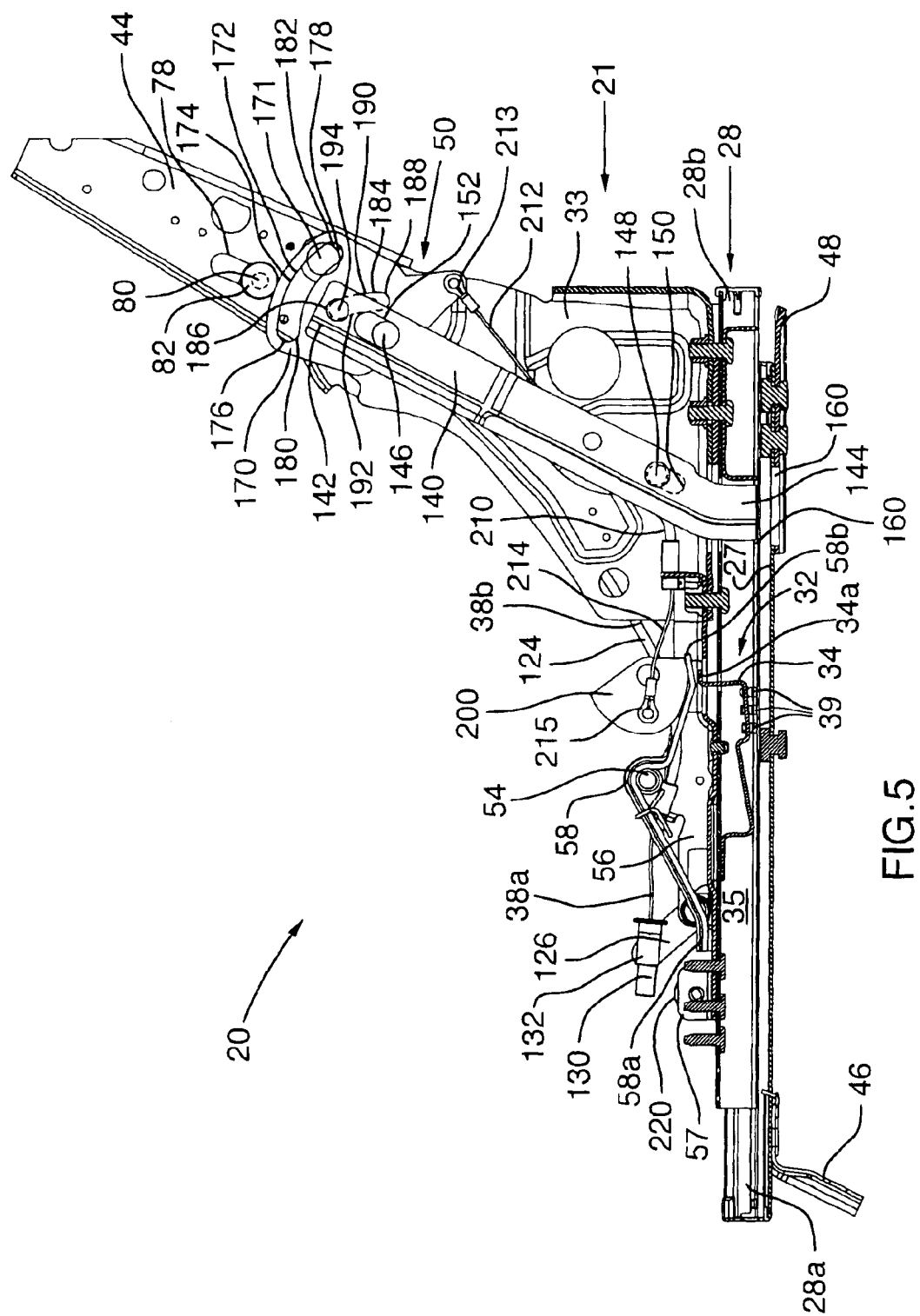
FIG. 5 is a cross-sectional left side elevational view similar to FIG. 5, taken along section line 5—5 of FIG. 1.
Figure 6:
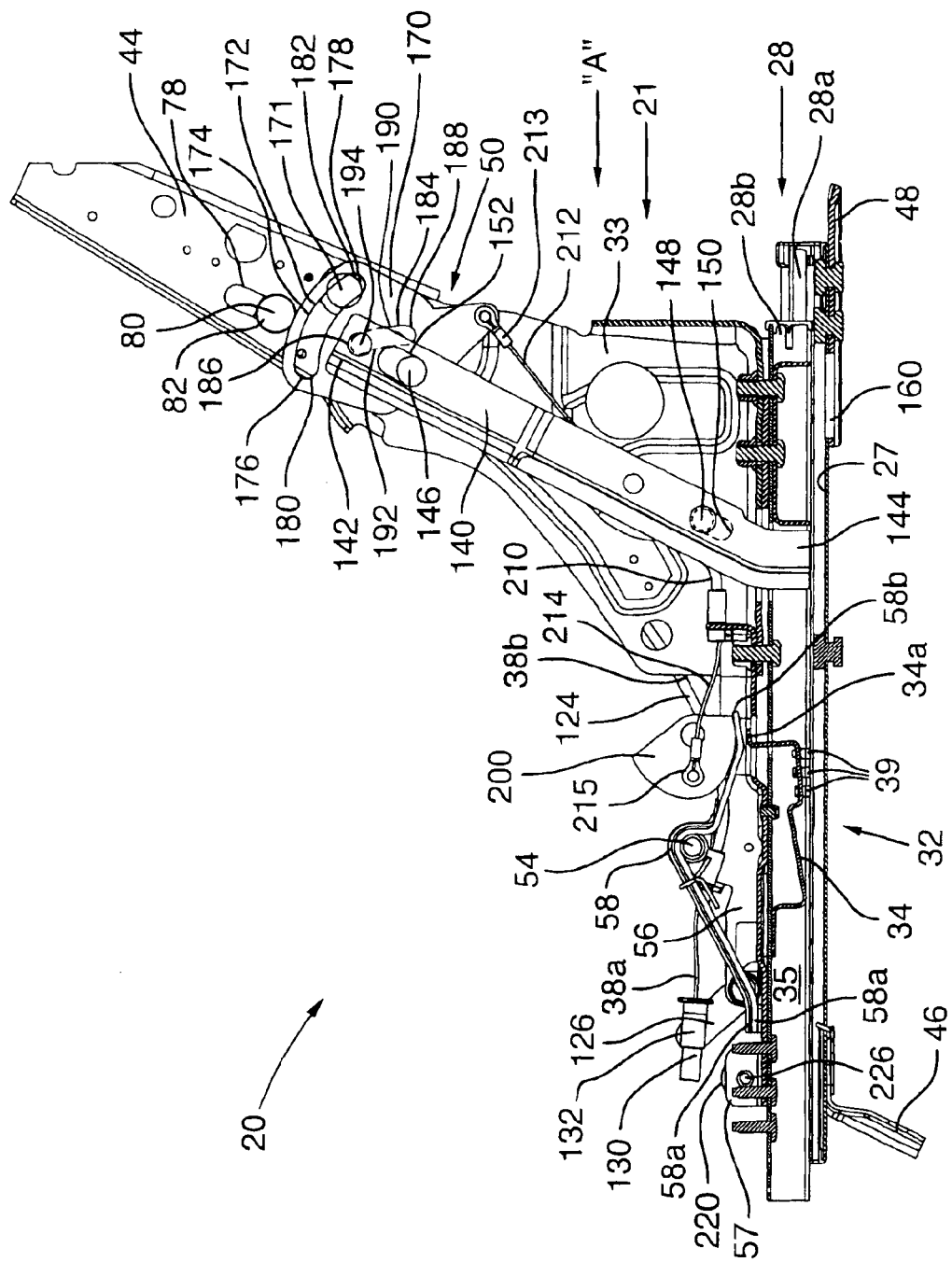
FIG. 6 is a cross-sectional left side elevational view similar to FIG. 5, but with the seat assembly in a forward comfort position.

The fold flat vehicle seat 20 also comprises a substantially rigid elongate link arm member 140 having an upper end 142 and a lower end 144 is operatively mounted adjacent its upper end 142 on the seatback member 40. Preferably, the elongate link arm member 140 is mounted at its upper end 142 on the seatback member 40 for pivotal movement by means of a mounting pin 146 disposed at the substantially horizontal seatback pivot axis "H", and by means of a guide pin 148 secured to the seat cushion member and engaged in a guide slot 150 adjacent the lower end 144 of the link arm member 140, as best seen in FIGS. 4 and 7. The link arm member 140 has a short motion accommodating slot 152 disposed near the upper end 142 of the link arm member 140 and oriented along the length of the link arm member 140. The motion accommodating slot 152 receives the mounting pin 146 therein to thereby accommodate the movement of the link arm member 140, as will now be discussed.

The link arm member 140 is operatively mounted, as aforesaid, for movement with the seatback member 40 between a lowered track engagement position and a raised track clearing position. The lowered track engagement position of the link arm member 140 corresponds to the substantially horizontal load supporting position of the seatback member 40, as can be best seen in FIG. 14. The raised track clearing position corresponds to the substantially upright occupiable design position of the seatback member 40, as can be best seen in FIGS. 1 through 5 and 16.

A link engaging portion 160, as is best seen in FIG. 15, is disposed on the fixed track member 28a for receiving the lower end 144 of the link arm member 140 when the seat assembly 21 is in a predetermined rear longitudinal position, as best seen in FIGS. 14 and 15. The link engaging portion 160 preferably comprises a slot 160 formed in an upwardly facing lower horizontal surface 27 of the fixed track member. The lower end 144 of the link arm member 140 enters the slot 160 when the link arm member 140 is in its lowered track engagement position.

The fold flat vehicle seat 20 further comprises a drive plate 170 which is pivotally mounted on the seatback member 40 by means of the mounting pin 146. The drive plate 170 is mounted for pivotal movement about the substantially horizontal seatback pivot axis "H" with the seatback member 40 between a initial position and a final position. The initial position of the drive plate 170 corresponds to the "E-Z entry" position of the seatback member 40, as best seen in FIG. 19. The final position of the drive plate 170 corresponds to the substantially horizontal load supporting position of the seatback member 40, as best seen in FIG. 14.

The seatback member 40 has a drive pin 171 securely mounted thereon in offset relation with respect to the substantially horizontal seatback pivot axis "H", for movement with the seatback member 40.

The drive plate 170 has a lost motion slot 172 formed therein adjacent an upper edge 174 of the drive plate 170, which lost motion slot 172 is arcuately shaped with the center of the defined arc at the mounting pin 146. The lost motion slot 172 has a forward end 176 and a rearward end 178, with a front drive pin engaging surface 180 disposed at the forward end 176 and a rear drive pin engaging surface 182 disposed at the rearward end 178.

The drive pin 171 is received in the lost motion slot 172 for travel therein. When the seatback member 40 is in its substantially upright occupiable design position, and the drive plate 170 is in its initial position, the drive pin 171 is at the rearward end of the lost motion slot 172. When the seatback member 40 is in its "E-Z entry" position, the drive pin 171 has engaged the front drive pin engaging surface disposed at the rearward end of the lost motion slot 172.

The drive plate 170 also has a drive slot 184 formed therein generally between the lost motion slot 172 and the mounting pin 146. The drive slot 184 has an upper end 186 and a lower end 188, and has a rear drive surface 190 and a front drive surface 192 each extending between the upper 186 and lower 188 ends. The drive slot 184 receives therein a driven pin 194 mounted adjacent the upper end 142 of the link arm member 140 between the motion accommodating slot 152 and the upper end 142 of the link arm member 140. The driven pin 194 is engaged in the drive slot 184 of the drive plate 170, for movement therein along the length of the drive slot 184. When the seatback member 40 is forwardly folded from the "E-Z entry" position to the substantially horizontal load supporting position, the drive pin 171 engages the front drive pin engaging surface 180, so as to move the drive plate 170 from its initial position to its final position.

As the drive plate 170 moves from its initial position, when the seatback member 40 is in its "E-Z entry" position, to its final position, whereat the seatback member 40 is in its substantially horizontal load supporting position, the rear drive surface 190 of the drive slot 184 frictionally engages the driven pin 194. Accordingly, the drive plate 170 drives the driven pin 194, to thereby move the link arm member 140 from its raised track clearing position, as best seen in FIGS. 9 through 13 and 19, to its lowered track engagement position, as best seen in FIGS. 14 and 15. As can be best seen in FIGS. 4–7 and 9, the driven pin 194 is disposed at the upper end 186 of the drive slot 184 when the seatback member 40 is in the substantially upright occupiable design position through the "E-Z entry" position, and as can be best seen in FIG. 14, the driven pin 194 is disposed at the lower end 188 of the drive slot 184 when the seatback member 40 is in the substantially horizontal load supporting position.

As mentioned earlier, the motion accommodating slot 152 receives the mounting pin 146 therein to thereby accommodate the movement of the link arm member 140 from its raised track clearing position to its lowered track engagement position.

When the link arm member 140 is in the lowered track engagement position, as can be best seen in FIGS. 14 and 15, the link arm member 140 interacts with the link engaging portion 160, of the fixed track member 28a, or in other words, the lower end 144 of the link arm member 140 is disposed in the slot 160. In this manner, forward folding of the seatback member 40 to the substantially horizontal load supporting position is permitted.

It can be seen that when the seat assembly 21 is disposed in its predetermined rear longitudinal position and the link arm member 140 is in the lowered track engagement position, longitudinal motion of the seat assembly 21 relative to the fixed track member 28a is precluded, so as to retain the seat assembly 21 in the predetermined rear longitudinal position.

Figure 10:
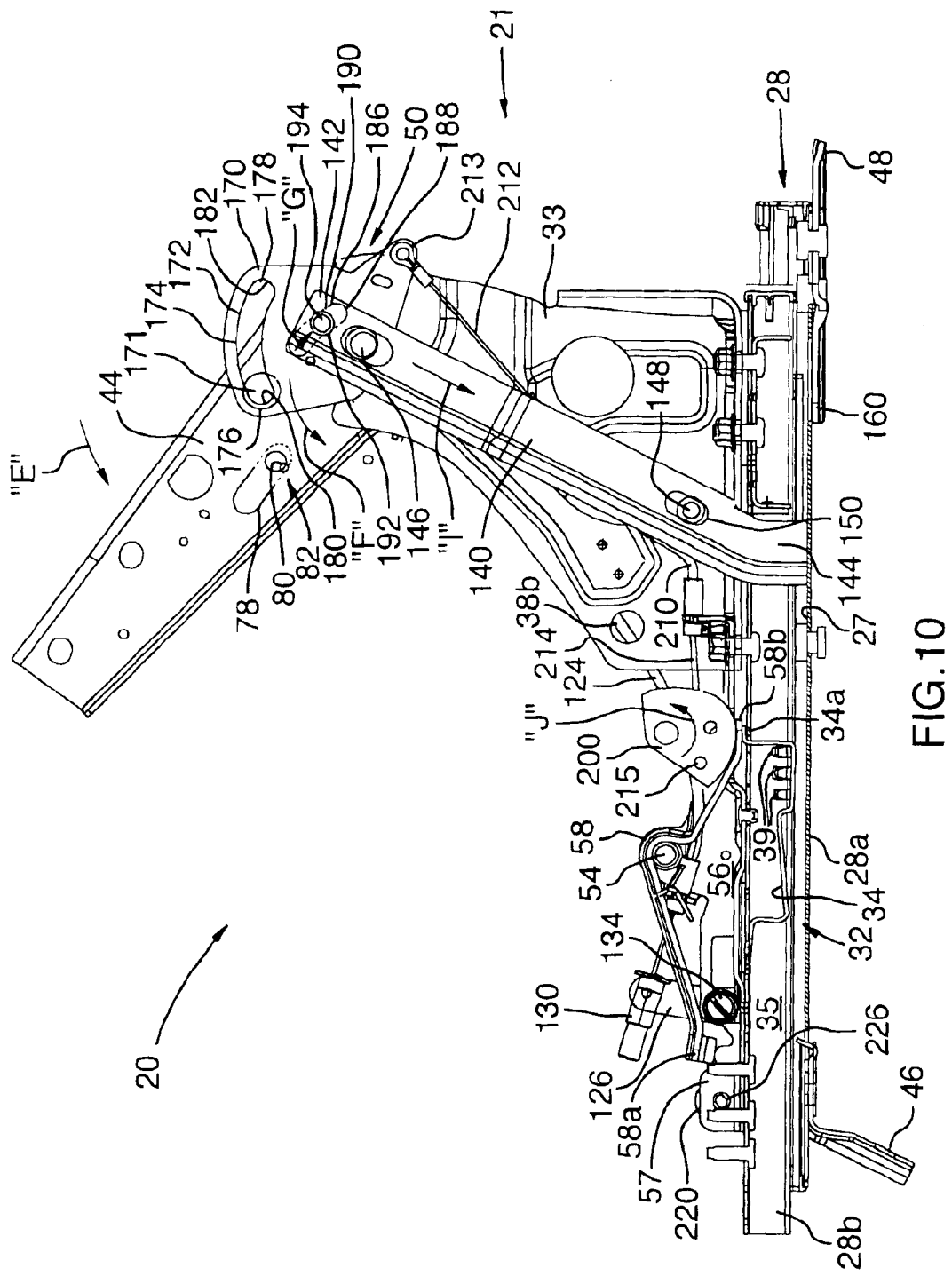
FIG. 10 is a cross-sectional left side elevational view similar to FIG. 9, but with the seatback having been folded forwardly to its over-ride position as defined by the lower end of the link arm member slidably engaging the lower track member, and with the track lock in its released configuration.

It can also be seen that when the vehicle seat 20 has been removed from the predetermined rear longitudinal position, or in other words when the vehicle seat 20 is disposed in a longitudinal position forwardly of its predetermined rear longitudinal position, and the seatback member 40 has been folded toward the substantially horizontal load supporting position, the lower end 144 of the link arm member 140 slidingly engages the upwardly facing lower horizontal surface 27 of the fixed track member 28a, as can be best seen in FIGS. 10 and 11. Therefore, the link arm member 140 cannot enter the slot 160, thus precluding the link arm member 140 from reaching its lowered track engagement position. In this manner, the seatback member 40 is precluded from folding forwardly all of the way to its substantially horizontal load supporting position. Instead, it is stopped at its "over-ride" position, thus precluding the headrest of the seatback member 40 from interfering with a part of the vehicle's interior disposed immediately in front of it.

It will be readily understood that in order to move the seat assembly 21 rearwardly, as shown in FIG. 11, from the comfort position shown in FIGS. 6 through 10, to its predetermined rear longitudinal position, the track lock means 32 must be moved to its released configuration. In order to accomplish such releasing of the track lock means 32 in conjunction with the seatback member 40 folding to its substantially horizontal load supporting position and the seat assembly 21 moving to its predetermined rear longitudinal position, the fold flat seat assembly 21 further comprises a locking cam member 200 pivotally mounted on the moveable seat track member for movement between a locking position, as best seen in FIGS. 4 through 9, and a releasing position, as best seen in FIGS. 10 through 15. In the locking position, the locking cam member 200 permits the track lock means 32 to move to its locked configuration, to thereby preclude the movable track member 28b from moving longitudinally relative to the fixed track member, thus retaining the seat assembly 21 in place longitudinally. In the releasing position, the locking cam member 200 causes the track lock means to move to the released configuration, to thereby permit the movable track member 28b to move longitudinally relative to the fixed track member 28a, thus allowing the seat assembly 21 to move longitudinally.

The locking cam member 200 is operatively connected to the drive plate 170 for movement therewith, by means of a yet another Bowden type cable, namely Bowden cable 210. The first end 212 of the Bowden cable 210 is connected to the bottom end of the drive plate 170 by means of a crimped connector 213. The second end 214 of the Bowden cable 210 is connected to the locking cam member 200 by means of a crimped connector 215. As such, as the drive plate 170 moves from its initial position to its final position, the drive plate 170 effects movement of the locking cam member 200 from its locking position, as best seen in FIGS. 4 through 9, to its releasing position, as best seen in FIGS. 10 through 15.

The fold flat vehicle seat 20 further preferably comprises a "hold-open" mechanism that is operable in conjunction with the "E-Z entry" feature of the seat assembly 21. The operation of the "E-Z entry" feature and the "hold-open" mechanism will now be described with reference to FIGS. 16 through 19. The "hold-open" mechanism comprises a second lever arm in the form of a bifurcated catch plate 220 pivotally mounted on an upwardly extending flange 57 on the mounting bracket 56, for movement between a start position, as best seen in FIG. 16, and a hold-open position, as best seen in FIGS. 17 and 18. When the bifurcated catch plate 220 is in the start position, the lever arm 126 is permitted to pivot to its releasing position, as indicated by arrow "X" in FIG. 17, to thereby unlock the track lock means 32. Once the seat assembly 21 has moved forwardly somewhat toward its "E-Z entry" position, as indicated by arrow "W" in FIG. 17, the straight leg 222 of the bifurcated catch plate 220 is displaced by a laterally projecting trip flange 224 on the fixed track member 28b. The bifurcated catch plate 220 is then moved to its hold-open position, as indicated by arrow "Y" of FIG. 17, under the biasing of a coil spring 226. In the hold-open position, a "J"-shaped leg 228 of the bifurcated catch plate 220 catches on a co-operating notch 126a in the lever arm 126, to retain the lever arm 126 in place, thereby keeping the track lock means 32 unlocked. Rearward longitudinal movement of the seat assembly 21 back to its rearmost position causes the laterally projecting trip flange 224 to urge the straight leg 222 of the bifurcated catch plate 220 back to its start position, thus allowing the lever arm 126 to lower the forward end 128a of the lever member 128, thereby locking the track lock means 32.

The operation of the fold flat vehicle seat 20 will now be discussed, with reference to FIGS. 8 through 15. The situation wherein a user wishes to move the seatback member 40 from its upright occupiable design position, as best seen in FIG. 8, to its substantially horizontal load supporting position, as best seen in FIG. 14, without activation of the "E-Z entry" mechanism, will be considered first. As is shown in FIG. 8, with the seatback member 40 in the design position, a user would grasp the second lever handle 96a, and pull it upwardly, so as to cause operatively upward movement of the Bowden type sheathed cable 98, in the direction of arrow "B". This action, in turn, causes the link member 76 to slide upwardly in the same direction, carrying with it the cam pin 94 past the camming shoulder 112. The foot portion 76c of link member 76 lifts the button fastener 74 positioned on the control crank member 70. Continued upward sliding of the link member 76 in this manner causes the control crank member 70 to rotate in a clockwise direction (as shown by arrow "C") to the second crank position, to thereby unlock the rotary recliner 50, as previously discussed. This unlocking action allows the seatback member 40 to be folded forwardly about the substantially horizontal seatback pivot axis "H" to the substantially horizontal load supporting position shown in FIG. 14.

Figure 9:
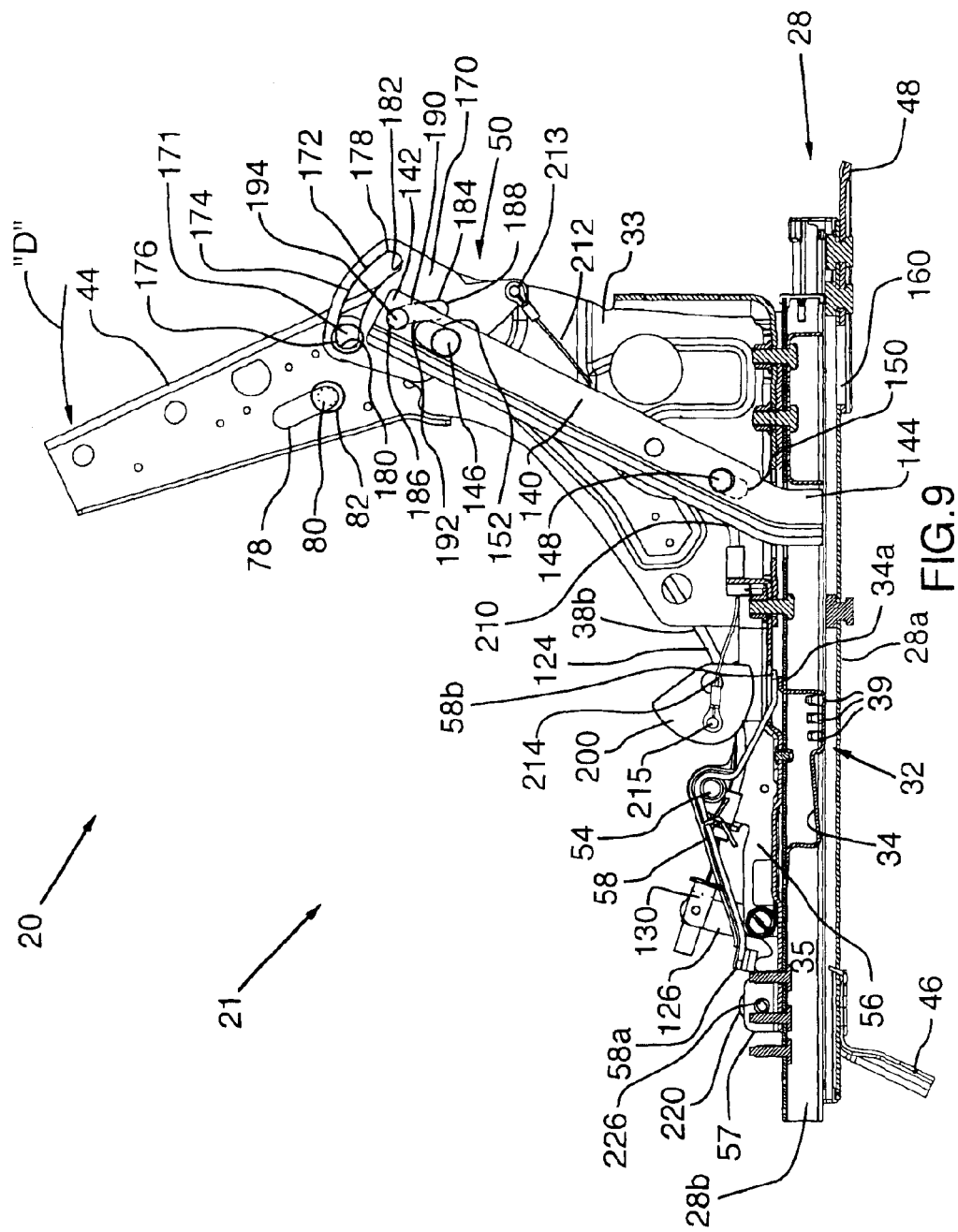
FIG. 9 is a cross-sectional left side elevational view similar to FIG. 6, but with the seatback having been folded forwardly to the same seatback angle as in the "E-Z entry" position, such that the drive pin on the seatback is engaging the forward end of the lost motion slot in the drive plate.

As can be seen in FIG. 9, when the seatback member 40 is folded to the forwardly folded angle corresponding to "E-Z entry" position, as indicated by arrow "D", the drive pin 171 engages the front drive pin engaging surface 180 disposed at the forward end of the lost motion slot 172. The seatback member 40 then folds forwardly even more, as indicate by arrow "E" in FIG. 10, from the position shown in FIG. 9, to the over-ride position as shown in FIG. 10. Concurrently, the drive pin 171 moves the drive plate 170 pivotally with the seatback member 40 from its initial position, as shown in FIG. 9, toward its final position, as indicated by arrow "F" in FIG. 10. The rear drive surface 190 of the drive slot 184 frictionally engages the driven pin 194, to move the driven pin 194 downwardly along the drive slot 184, as indicated by arrow "G" in FIG. 10. The link arm member 140 is therefore correspondingly moved downwardly, as indicated by arrow "I" in FIG. 10, until the lower end of the link arm member 140 slidingly engages the slot 160 found in the upwardly facing lower horizontal surface 27 of the fixed track member 28a.

Also, the locking cam member 200 concurrently rotates from its locking position to its releasing position, as indicated by arrow "J" in FIG. 10, thereby releasing the track lock means 32.

As shown in FIG. 10, when the seatback member 40 is in its over-ride position, the lower end 144 of the link arm member 140 slidingly engages the upwardly facing lower horizontal surface 27 of the fixed track member, and continues to do so as the seat assembly 21 is moved longitudinally rearwardly, as indicated by arrow "K" in FIG. 11, by means of manual effort by a user, towards its predetermined rear longitudinal position.

When the seat assembly 21 reaches its predetermined rear longitudinal position, as indicated by arrow "L" FIG. 12, the link arm member 140 is initially in a position immediately above the slot 160, as is shown in FIG. 13. At that point, it is possible for the link arm member 140 to then enter the slot 160. Accordingly, a user can continue to fold the seatback member 40 forwardly to the position shown in FIG. 14, as indicated by arrow "M". Optionally, a spring that biases the seatback member 40 over the seat cushion member 30 can be used to assist in the forward folding of the seatback member 40 over the seat cushion member 30. Correspondingly, the drive plate 170 pivotally moves with the seatback member 40, as indicated by arrow "N". The rear drive surface 190 of the drive slot 184 continues to push downwardly on the driven pin 194 of the link arm member 140, to thereby move the driven pin 194 to the lower end 188 of the drive slot 184, as indicated by arrow "O". In this manner, the link arm member 140 is moved downwardly to its lowered track engagement position, or in other words into the slot 160, as shown in FIGS. 14 and 15, as indicated by arrow "P". The locking cam member 200 is rotatable a slight bit further at its locking position 15, as indicated by arrow "Q" to help preclude rattling of the track lock means 32.

At this point, the seatback member 40 is in its substantially horizontal load supporting position and the seat assembly 21 in its predetermined rear longitudinal position. The seat assembly 21 is precluded from moving from its predetermined rear longitudinal position by the engagement of the lower end 144 of the link arm member 140 with the slot 160.

When the user wishes to return the seatback member 40 to substantially upright occupiable design position, the rotary recliner 50 is again unlocked using the second lever handle 96a and the seatback member 40 is thereafter manually pivoted rearwardly and upwardly until the seatback is in the correct position. During such movement, the drive plate 170 is rotated by the drive pin 171 on the seatback member 40 contacting the rear drive pin engaging surface of the lost motion slot 172. The link arm member 140 is correspondingly raised from its lowered track engagement position to its raised track clearing position, by means of the front drive surface 192 of the drive slot 184 engaging the driven pin 194 of the link arm member 140.

The situation wherein a user wishes to move the seatback member 40 from its upright occupiable design position, as best seen in FIG. 16, to its "E-Z entry" position, as best seen in FIGS. 17 through 19, and then move the seat assembly to its predetermined rear longitudinal position, will now be discussed with reference to FIGS. 16 through 19. As is shown in FIG. 16, with the seatback member 40 in the design position, a user would grasp the first lever handle 72a, and pull it upwardly, as indicated by arrow "T", so as to cause operatively upward movement of the Bowden type sheathed cable 72b. This action, in turn, causes the control crank member 70 to rotate in a clockwise direction (as shown by arrow "U") to the second crank position, to thereby unlock the rotary recliner 50, as previously discussed. This unlocking action allows the seatback member 40 to be folded forwardly about the substantially horizontal seatback pivot axis "H", as indicated by arrow "V". The track lock means is also unlocked, as seen in FIG. 19 and as discussed previously, via the Bowden type sheathed cable generally designated by reference numeral 124, the lever arm 126, and the rocker arm 58. The coil spring 26 pulls the seat assembly 21 forwardly, as indicated by arrow "W", to the "E-Z entry" position as shown in FIGS. 17 through 19.

As discussed earlier, the lever arm 126 is pivoted as indicated by arrow "X" in FIG. 17 by the pulling action of the Bowden type sheathed cable 124, to thereby release the track lock means 32. Since the seat assembly 21 has moved forwardly to its "E-Z entry" position, the bifurcated catch plate 220 moves to its hold-open position, as indicated by arrow "Y" in FIG. 17, under the biasing of the coil spring 226.

FIG. 18 shows the second lever handle 96a being lifted upwardly, as indicated by arrow "Z", in the same manner as in FIG. 8, to thereby permit the seatback member 40 to fold forwardly to its substantially horizontal load supporting position and the seat assembly to move to its predetermined rear longitudinal position, in the same manner as is discussed with reference to FIGS. 8 through 15. When the lever handle 96a is moved upwardly, the link member 76 is moved to its upper position. The cam pin 94 correspondingly clears the camming shoulder 112, thereby permitting the coil spring 106 to return the interlock plate 100 to its first rotational limit position, as indicated by arrow "AA" in FIG. 18.

As can be understood from the above description and from the accompanying drawings, the present invention provides a fold flat vehicle seat wherein a substantially horizontal load supporting position is attainable only in a predetermined rear longitudinal position of said seat assembly, wherein the seatback member folds over the seat cushion member to a substantially horizontal load supporting position, irrespective of the longitudinal starting position of the seat assembly, wherein the headrest of the seatback member being forwardly folded does not interfere with a part of the vehicle's interior disposed immediately in front of it, wherein the gap between longitudinally adjacent seats is minimized, or made nonexistent, and wherein the chance of damaging various parts or components of the mechanism is minimized, or made nonexistent, when the seatback member is folded from the "E-Z entry" position to the fully forwardly folded position, all of which features are unknown in the prior art.

Other variations of the above principles will be apparent to those who are knowledgeable in the field of the invention, and such variations are considered to be within the scope of the present invention. Further, other modifications and alterations may be used in the design and manufacture of the fold flat vehicle seat of the present invention without departing from the spirit and scope of the accompanying claims.

I claim:

1. A fold flat vehicle seat comprising:
   a movable track member slidably engaging a fixed track member having a seat assembly mounted thereon for longitudinal sliding movement of said movable track member and said seat assembly relative to said fixed track member along a longitudinal axis;
   a track lock means operatively interconnected between said movable and fixed track members and movable between a locked configuration whereat said movable track member is precluded from moving longitudinally relative to said fixed track member and a released configuration whereat said movable track member is permitted to move longitudinally relative to said fixed track member;
   wherein said seat assembly includes a seat cushion member mounted on said movable track member and a seatback member mounted on said seat cushion member for forward folding about a seatback pivot axis between a substantially upright occupiable design position and a substantially horizontal load supporting position;
   a seatback member latch means operatively engaged between said seatback member and said seat cushion member to selectively control said forward folding of said seatback member;
   a link arm member having an upper end and a lower end and being operatively mounted adjacent its upper end on said seatback member, for movement with said seatback member between a lowered track engagement position corresponding to said substantially horizontal load supporting position of said seatback member, and a raised track clearing position corresponding to said substantially upright occupiable design position of said seatback member; and,
   a link engaging portion disposed on said fixed track member for receiving the lower end of said link arm member when said seat assembly is in a predetermined rear longitudinal position;
   wherein, when said link arm member is in said lowered track engagement position and only then, said link arm member interacts with said link engaging portion of said fixed track member to permit said forward folding of said seatback member to said substantially horizontal load supporting position and to threat preclude longitudinal motion of said seat assembly relative to said fixed track member, so as to retain said seat assembly in said predetermined rear longitudinal position.

2. The fold flat vehicle seat of claim 1, wherein said link engaging portion comprises a slot formed in an upwardly facing lower horizontal surface of said fixed track member.

3. The fold flat vehicle seat of claim 2, wherein, when said link arm member is in said lowered track engagement position, the lower end of said link arm member is disposed in said slot.

4. The fold flat vehicle seat of claim 3, wherein, when said seat assembly has been removed from said predetermined rear longitudinal position, and said seatback member has been folded toward said substantially horizontal load supporting position, the lower end of said link arm member slidingly engages said upwardly facing lower horizontal surface of said fixed track member, so as to preclude said link arm member from moving to said lowered track engagement position, thereby to preclude said seatback member from being forwardly folded to said substantially horizontal load supporting position.

5. The fold flat vehicle seat of claim 4, wherein said link arm member is mounted at its upper end on said seatback member for pivotal movement by means of a mounting pin.

6. The fold flat vehicle seat of claim 5, wherein said mounting pin is disposed at said seatback pivot axis.

7. The fold flat vehicle seat of claim 6, wherein said seatback member has a forwardly tilted easy entry position disposed angularly between said substantially upright occupiable design position and said substantially horizontal load supporting position, whereat said track lock means has moved to its released configuration to permit said longitudinal sliding movement of said movable track member and said seat assembly relative to said fixed track member, and wherein said link arm member is in said raised track clearing position.

8. The fold flat vehicle seat of claim 7, further comprising a drive plate pivotally mounted on said seatback member for pivotal movement about said seatback pivot axis with said seatback member between a initial position corresponding to the easy entry position of said seatback member and a final position corresponding to said substantially horizontal load supporting position of said seatback member.

9. The fold flat vehicle seat of claim 8, further comprising a drive slot formed in said drive plate.

10. The fold flat vehicle seat of claim 9, wherein said link arm member further comprises a driven pin mounted adjacent said upper end thereof, said driven pin being engaged in said drive slot of said drive plate, wherein said drive plate drives said driven pin to thereby move said link arm member to said lowered track engagement position.

11. The fold flat vehicle seat of claim 10, wherein said drive slot has an upper end and an lower end.

12. The fold flat vehicle seat of claim 11, wherein said driven pin is disposed at said upper end of said drive slot when said seatback member is in said substantially upright occupiable design position through said easy entry position and is disposed at said lower end of said drive slot when said seatback member is in said substantially horizontal load supporting position.

13. The fold flat vehicle seat of claim 12, wherein said seatback member has a drive pin securely mounted thereon in offset relation with respect to said seatback pivot axis, and said drive plate has a lost motion slot that receives said drive pin for travel therein, such that when said seatback member is in said easy entry position, said drive pin engages said drive pin engaging surface.

14. The fold flat vehicle seat of claim 13, wherein, when said seatback member is forwardly folded from said easy entry position to said substantially horizontal load supporting position, said drive pin engages said drive pin engaging surface, so as to move said drive plate from said initial position to said final position, thereby moving said link arm member from said raised track clearing position to said lowered track engagement position.

15. The fold flat vehicle seat of claim 14, wherein said link arm member has a motion accommodating slot adjacent said upper end, which motion accommodating slot receives said mounting pin therein.

16. The fold flat vehicle seat of claim 15, further comprising a locking cam member pivotally mounted on said moveable seat track member for movement between a locking position whereat said locking cam member permits said track lock member to move to said locked configuration and a releasing position whereat said locking cam member moves said track lock means to said released configuration.

17. The fold flat vehicle seat of claim 16, wherein said locking cam member is operatively connected to said drive plate for corresponding movement therewith, such that said drive plate effects movement of said locking cam member from said releasing position to said locking position as said drive plate moves from said initial position to said final position.

18. The fold flat vehicle seat of claim 17, wherein said locking cam member is operatively connected to said drive plate by means of a sheathed cable.

19. The fold flat vehicle seat of claim 18, further comprising a first lever arm pivotally mounted on said movable track member for movement between a releasing position whereat said first lever arm causes said track lock means to move to said released configuration and a locking position whereat said first lever arm permits said track lock means to move to said locked configuration.

20. The fold flat vehicle seat of claim 19, wherein said first lever arm is operable by means of a sheathed cable member operatively connected between said first lever arm, and wherein forward folding movement of said seatback member a threshold distance from said substantially upright occupiable design position toward said substantially horizontal load supporting position causes said first lever arm to move correspondingly from said locking position to said releasing position.

21. The fold flat vehicle seat of claim 20, further comprising a second lever arm pivotally mounted on said movable track member for movement between an hold-open position whereat said second lever arm retains said first lever arm in said locking position and a start position whereat said second lever arm permits said first lever arm to move to said releasing position.

* * * * *